(12) United States Patent
Sasaki

(10) Patent No.: US 7,199,950 B2
(45) Date of Patent: Apr. 3, 2007

(54) EXTENSION SPRING INSTALLATION STRUCTURE OF A LENS BARREL

(75) Inventor: Takamitsu Sasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/420,952

(22) Filed: May 30, 2006

(65) Prior Publication Data

US 2006/0268436 A1 Nov. 30, 2006

(30) Foreign Application Priority Data

May 31, 2005 (JP) ............... P2005-160115

(51) Int. Cl.
*G02B 7/02* (2006.01)
(52) U.S. Cl. .................... 359/822; 359/819
(58) Field of Classification Search ............ 359/822, 359/819, 821, 823, 826, 811, 813
See application file for complete search history.

(56) References Cited

U.S. PATENT DOCUMENTS

| | | |
|---|---|---|
| 4,721,972 A | 1/1988 | Wakabayashi |
| 4,771,303 A | 9/1988 | Matsumoto et al. |
| 4,792,822 A | 12/1988 | Akiyama et al. |
| 4,937,609 A | 6/1990 | Wakabayashi et al. |
| 5,737,644 A | 4/1998 | Nomura et al. |
| 5,793,537 A | 8/1998 | Nomura et al. |
| 5,812,887 A | 9/1998 | Nomura et al. |
| 6,023,376 A | 2/2000 | Nomura et al. |
| 6,115,190 A | 9/2000 | Hirai |
| 6,204,977 B1 | 3/2001 | Iwasa |
| 6,952,526 B2 | 10/2005 | Nomura |
| 6,959,148 B2 | 10/2005 | Nomura |
| 6,963,694 B2 | 11/2005 | Nomura |
| 6,965,733 B1 | 11/2005 | Nomura |
| 6,978,088 B2 | 12/2005 | Nomura |
| 6,978,089 B2 | 12/2005 | Nomura et al. |
| 6,987,929 B2 | 1/2006 | Nomura |
| 6,987,930 B2 | 1/2006 | Nomura |
| 6,990,291 B2 | 1/2006 | Nomura |

(Continued)

FOREIGN PATENT DOCUMENTS

JP 2001-215387 8/2001

OTHER PUBLICATIONS

U.S. Appl. No. 11/420,680 to Sasaki, filed May 26, 2006.

*Primary Examiner*—Timothy Thompson
(74) *Attorney, Agent, or Firm*—Greenblum & Bernstein, P.L.C.

(57) ABSTRACT

An extension spring installation structure of a lens barrel includes relatively movable members, one of which supports an optical element, including an extension coil spring biasing the relatively movable members toward each other; and a spring-hook portion and a tilt-restriction portion formed on a relatively movable members. An engaging portion of the extension coil spring is engaged with the spring-hook portion by movement of the extension coil spring toward the spring-hook portion. The spring-hook portion is shaped so as to be prevented from being disengaged from the engaging portion of the extension coil spring even if moved along the axis of the coil spring portion thereof with the engaging portion engaged with the spring-hook portion. The tilt-restriction portion prevents the coil spring portion from moving in a radial direction of the coil spring portion with the engaging portion engaged with the spring-hook portion.

16 Claims, 18 Drawing Sheets

U.S. PATENT DOCUMENTS

| | | |
|---|---|---|
| 7,010,224 B2 | 3/2006 | Nomura |
| 7,013,081 B2 | 3/2006 | Nomura et al. |
| 7,019,915 B2 | 3/2006 | Sakamoto |
| 7,025,512 B2 | 4/2006 | Nomura |
| 7,027,727 B2 | 4/2006 | Nomura |
| 7,031,603 B2 | 4/2006 | Nomura |
| 7,031,604 B2 | 4/2006 | Nomura |
| 7,035,535 B2 | 4/2006 | Nomura |
| 7,039,308 B2 | 5/2006 | Nomura |
| 7,039,311 B2 | 5/2006 | Nomura |
| 7,043,154 B2 | 5/2006 | Nomura |
| 7,050,713 B2 | 5/2006 | Nomura |
| 7,058,293 B2 | 6/2006 | Nomura |
| 7,062,163 B2 | 6/2006 | Nomura |
| 7,068,929 B2 | 6/2006 | Nomura |
| 7,079,761 B2 | 7/2006 | Nomura |
| 7,079,762 B2 | 7/2006 | Nomura |
| 7,085,486 B2 | 8/2006 | Nomura |
| 7,088,916 B2 | 8/2006 | Nomura |
| 2004/0051968 A1 | 3/2004 | Nomura |
| 2004/0141737 A1 | 7/2004 | Nomura |
| 2005/0168847 A1 | 8/2005 | Sasaki |
| 2005/0169621 A1 | 8/2005 | Nomura |
| 2005/0254140 A1 | 11/2005 | Sakamoto |

EXTENSION SPRING INSTALLATION STRUCTURE OF A LENS BARREL

BACKGROUND OF THE INVENTION

1. Field of the Invention

The present invention relates to an extension spring installation structure for installation of one or more extension springs adopted to eliminate backlash in a lens barrel.

2. Description of the Related Art

Play (backlash) is structurally indispensable between two members movably sliding on each other. However, since backlash concurrently has an influence on the accuracy of movement of the movable members, various types of backlash eliminating structures or mechanisms have been proposed. For instance, a backlash eliminating structure which eliminates backlash between two members (e.g., lens group support frames) which are movable relative to each other by the use of extension springs which bias the two members in directions to approach each other is known in the art.

Each of the aforementioned extension springs is unstable and easily comes off until opposite ends of the extension spring are seated over hooked portions of the aforementioned two members, respectively. Accordingly, it is conventionally the case that the opposite ends of the extension spring are simultaneously seated over the hooked portions of the two members, respectively, or that one of the opposite ends of the extension spring which is firstly seated over the associated hooked portion is cemented thereto before the other end of the extension spring is seated over the associated hooked portion to prevent each end of the extension spring from coming off the associated hooked portion unintentionally. However, such an extension spring installation manner is troublesome, and accordingly, there has been a demand for an improved extension spring installation method which is far superior in regard to ease of installation compared to conventional extension spring installation methods.

SUMMARY OF THE INVENTION

The present invention provides an extension spring installation structure for installation of one or more extension springs adopted to eliminate backlash in a lens barrel, wherein the extension spring installation structure improves the ease installation of the extension springs.

According to an aspect of the present invention, an extension spring installation structure of a lens barrel is provided, including a pair of relatively movable members which are movable relative to each other in an optical axis direction and at least one of which supports an optical element, the extension spring installation structure including at least one extension coil spring which biases the pair of relatively movable members in directions to approach each other, the extension coil spring including a coil spring portion and a pair of engaging portions provided at opposite ends of the coil spring portion, respectively; and at least one spring-hook portion and at least one tilt-restriction portion which are formed on at least one of the pair of relatively movable members. One of the pair of engaging portions is engaged with the spring-hook portion by a movement of the extension coil spring toward the spring-hook portion in a direction along an axis of the coil spring portion. The spring-hook portion is shaped so as to be prevented from being disengaged from the one engaging portion of the extension coil spring even in the case where the extension coil spring is moved along the axis of the coil spring portion in a state where the one engaging portion of the extension coil spring is engaged with the spring-hook portion. The tilt-restriction portion prevents the coil spring portion from moving in a radial direction of the coil spring portion in the state where the one engaging portion of the extension coil spring is engaged with the spring-hook portion.

It is desirable for the spring-hook portion to include a deformation guide surface, wherein, when the extension coil spring is moved in an insertion direction along the axis of the coil spring portion so as to be engaged with the spring-hook portion, the deformation guide surface firstly comes into contact with the one engaging portion of the extension coil spring and subsequently resiliently deforms the one engaging portion of the extension coil spring in a predetermined deforming direction so that the one engaging portion of the extension coil spring rides over the spring-hook portion to be seated over the spring-hook portion.

It is desirable for the spring-hook portion to include a retaining projection which prevents the one engaging portion of the extension coil spring from moving in a direction so as to be disengaged from the spring-hook portion after the one engaging portion of the extension coil spring rides over the spring-hook portion and is seated over the spring-hook portion.

It is desirable for the tilt-restriction portion to restrict movement of the coil spring portion in at least the predetermined deforming direction.

It is desirable for the tilt-restriction portion to include a cylindrical surface which surrounds the spring-hook portion.

It is desirable for the spring-hook portion to be shaped as a projection which projects from the cylindrical surface in a radially outward direction of the one of the pair of relatively movable members.

It is desirable for the spring-hook portion to include a first projection and a second projection which project from a radially outer end portion of the spring-hook portion substantially in opposite directions away from each other along the optical axis direction, wherein the deformation guide surface is formed on the first projection, and a radially outer end surface of the spring-hook portion is provided between the first projection and the second projection and lies in a plane substantially parallel to the optical axis.

It is desirable for the deformation guide surface to lie in a plane which is inclined with respect to the optical axis direction.

It is desirable for the one of the pair of relatively movable members, which includes the tilt-restriction portion, to include an annular member, and the tilt-restriction portion is formed along an inner peripheral surface of the annular member.

It is desirable for the one of the pair of relatively movable members to include an inward flange which projects radially inwards from the inner peripheral surface of the annular member, and wherein a portion of the tilt-restriction portion is formed in the inward flange.

It is desirable for the one engaging portion of the extension coil spring to be shaped as a loop, and for the spring-hook portion is inscribed in the loop at four corners of the spring-hook portion in the state where the one engaging portion of the extension coil spring is engaged with the spring-hook portion. According to this construction, the stability of engagement of the one engaging portion of the extension coil spring with the spring-hook portion is improved.

It is desirable for the extension coil spring, the spring-hook portion and the tilt-restriction portion to include at least two extension coil springs, at least two spring-hook portions and at least two tilt-restriction portions, respectively, which are arranged at different circumferential positions about the optical axis. According to this construction, the one of the pair of relatively movable members can support the optical element with a high degree of precision.

It is desirable for the two extension coil springs, the two spring-hook portions and the two tilt-restriction portions to be symmetrically arranged with respect to the optical axis.

It is desirable for each of the pair of relatively movable members to support a lens group of a zoom lens optical system.

It is desirable for the pair of relatively movable members to be moved relative to each other in the optical axis direction by a rotation of a cam ring.

In an embodiment, a lens barrel is provided, including a front annular movable member and a rear annular movable member, which are arranged on an axis common with an optical axis of an optical element, to be movable relative to each other in the optical axis direction, at least one of the front and rear annular movable members supporting the optical element; at least one extension coil spring which is extended to be installed between the front and rear annular movable members to bias the front and rear annular movable members in directions to approach each other, the extension coil spring including a coil spring portion and a pair of looped ends provided at opposite ends of the coil spring portion, respectively; and at least one spring-hook portion and at least one tilt-restriction portion which are formed on at least one of the front and rear annular movable members. One of the pair of looped ends is engaged with the spring-hook portion by a movement of the extension coil spring toward the spring-hook portion in a direction along an axis of the coil spring portion. The spring-hook portion is shaped so that the one looped end of the extension coil spring is prevented from being disengaged therefrom even if the extension coil spring is moved along the axis of the coil spring portion in a state where the one looped end of the extension coil spring is engaged with the spring-hook portion. The tilt-restriction portion restricts movement of the coil spring portion in a radial direction of the coil spring portion in the state where the one looped end of the extension coil spring is engaged with the spring-hook portion.

According to the present invention, an extension spring installation structure of a lens barrel which is excellent in regard to ease of installation of the extension coil spring is achieved, wherein the extension coil spring is prevented from coming off the spring-hook portion unintentionally when the extension coil spring is extended so as to be installed between the pair of relatively movable members.

The present disclosure relates to subject matter contained in Japanese Patent Application No. 2005-160115 (filed on May 31, 2005) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
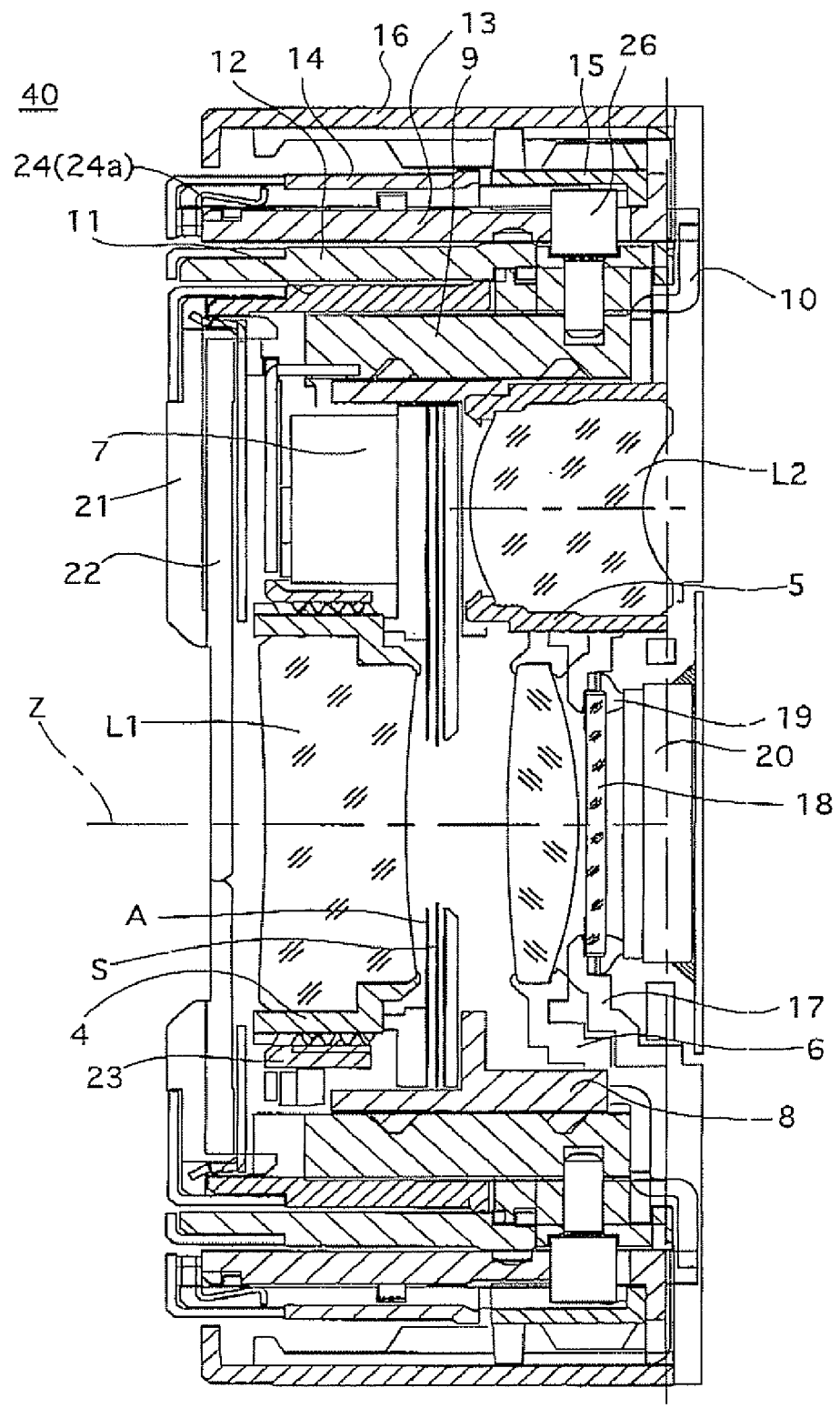
FIG. 1 is a longitudinal sectional view of an embodiment of a retractable zoom lens according to the present invention, showing the retractable zoom lens in the retracted state.
Figure 2:
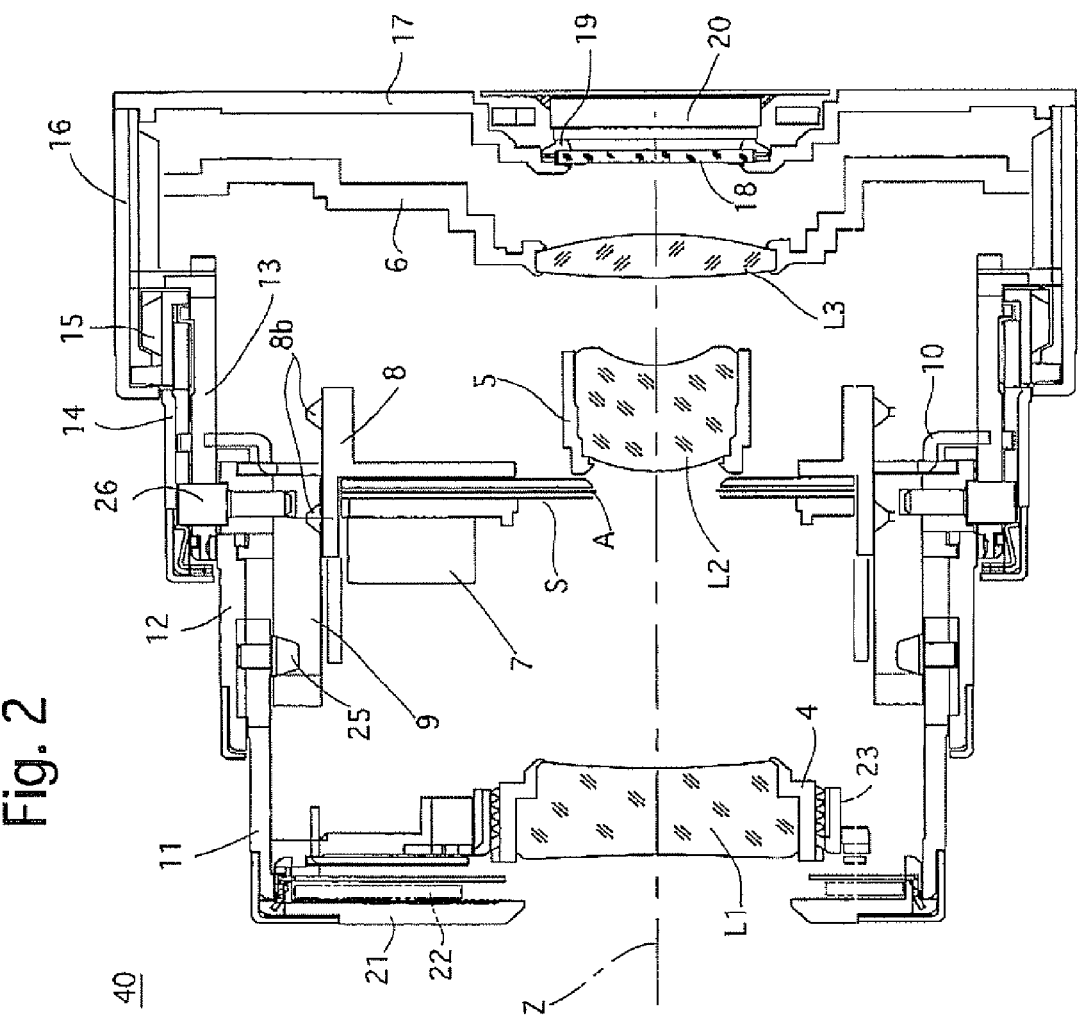
FIG. 2 is a longitudinal sectional view of the zoom lens shown in FIG. 1, showing a ready-to-photograph state of the zoom lens at the wide-angle extremity.
Figure 3:
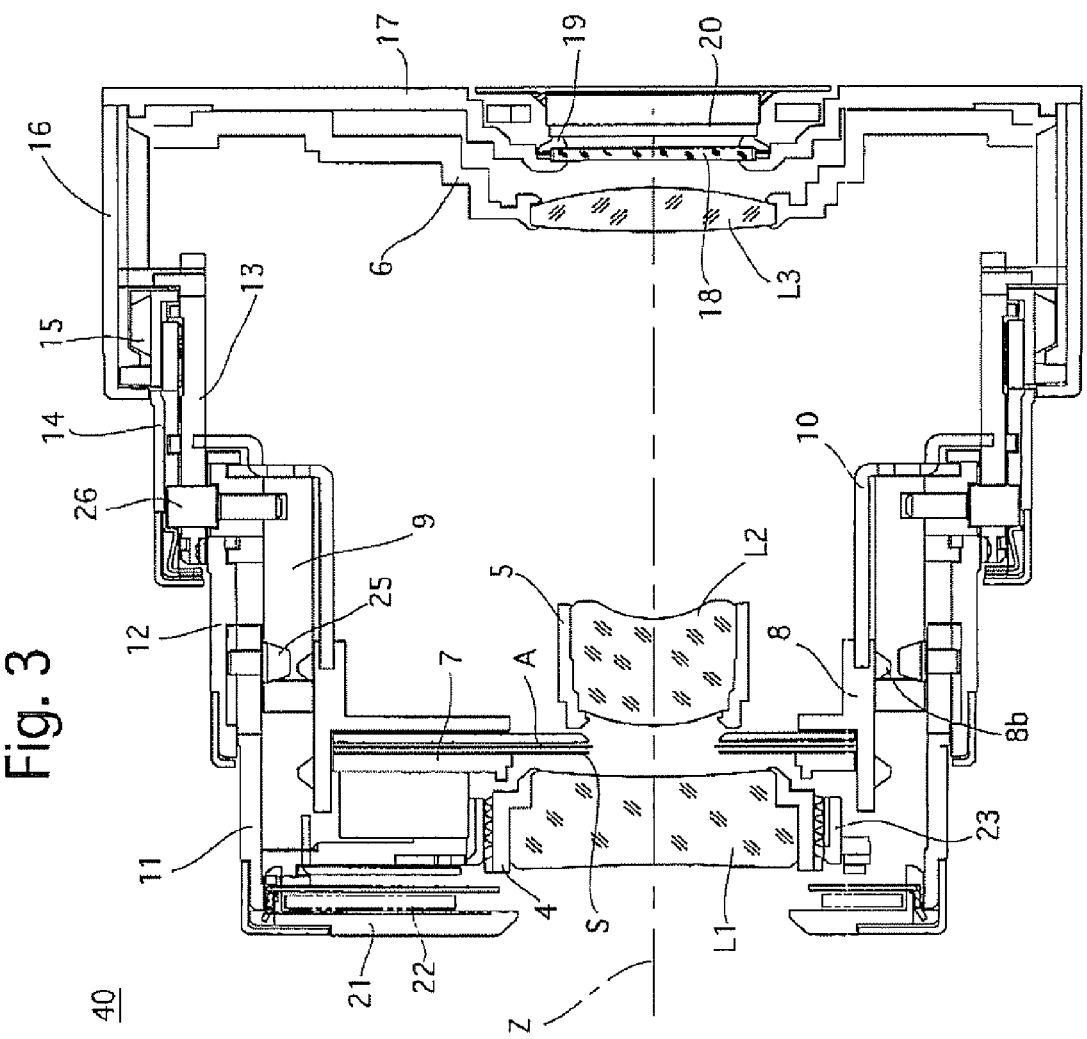
FIG. 3 is a longitudinal sectional view of the zoom lens shown in FIG. 1, showing a ready-to-photograph state of the zoom lens at the telephoto extremity.

FIGS. 1 through 3 are longitudinal sectional views of an embodiment of a zoom lens 40 to which the present invention is applied. The zoom lens 40 is incorporated in a digital camera. FIG. 1 shows a state where the zoom lens 40 is accommodated (retracted) in the camera body (not shown) of the digital camera. FIG. 2 shows a ready-to-photograph state of the zoom lens 40 at the wide-angle extremity while FIG. 3 shows a ready-to-photograph state of the zoom lens 40 at the telephoto extremity.

The photographing optical system of the zoom lens 40 includes a first lens group L1, a shutter S, a diaphragm A, a second lens group L2, a third lens group L3, a low-pass filter 18, and a CCD image sensor 20. In a ready-to-photograph state, these optical elements lie on a common photographing optical axis Z (See FIGS. 2 and 3). The first lens group L1 and the second lens group L2 are driven along the photographing optical axis Z in a predetermined moving manner to perform a zooming operation, while the third lens group L3 is driven along the photographing optical axis Z to perform a focusing operation. In the following description, the term "optical axis direction" refers to a direction parallel to the photographing optical axis Z unless otherwise stated. Additionally, in the following description, the term "forward/rearward direction" refers to a direction along the photographing optical axis Z; the object side (the left side as viewed in FIG. 1) and the image side (the right side as viewed in FIG. 1) are defined as forward and rearward, respectively.

The zoom lens 40 is provided in a camera body with a stationary ring 16 fixed to the camera body. A CCD support plate 17 is fixed to a rear portion of the stationary barrel 16 from behind. The CCD support plate 17 holds the CCD image sensor 20. The low-pass filter 18 is held by the CCD support plate 17 to be positioned in front of the CCD image sensor 20. An annular dust-tight sealing member 19 is installed between the low-pass filter 18 and the CCD image sensor 20 to seal the gap therebetween.

Figure 7:
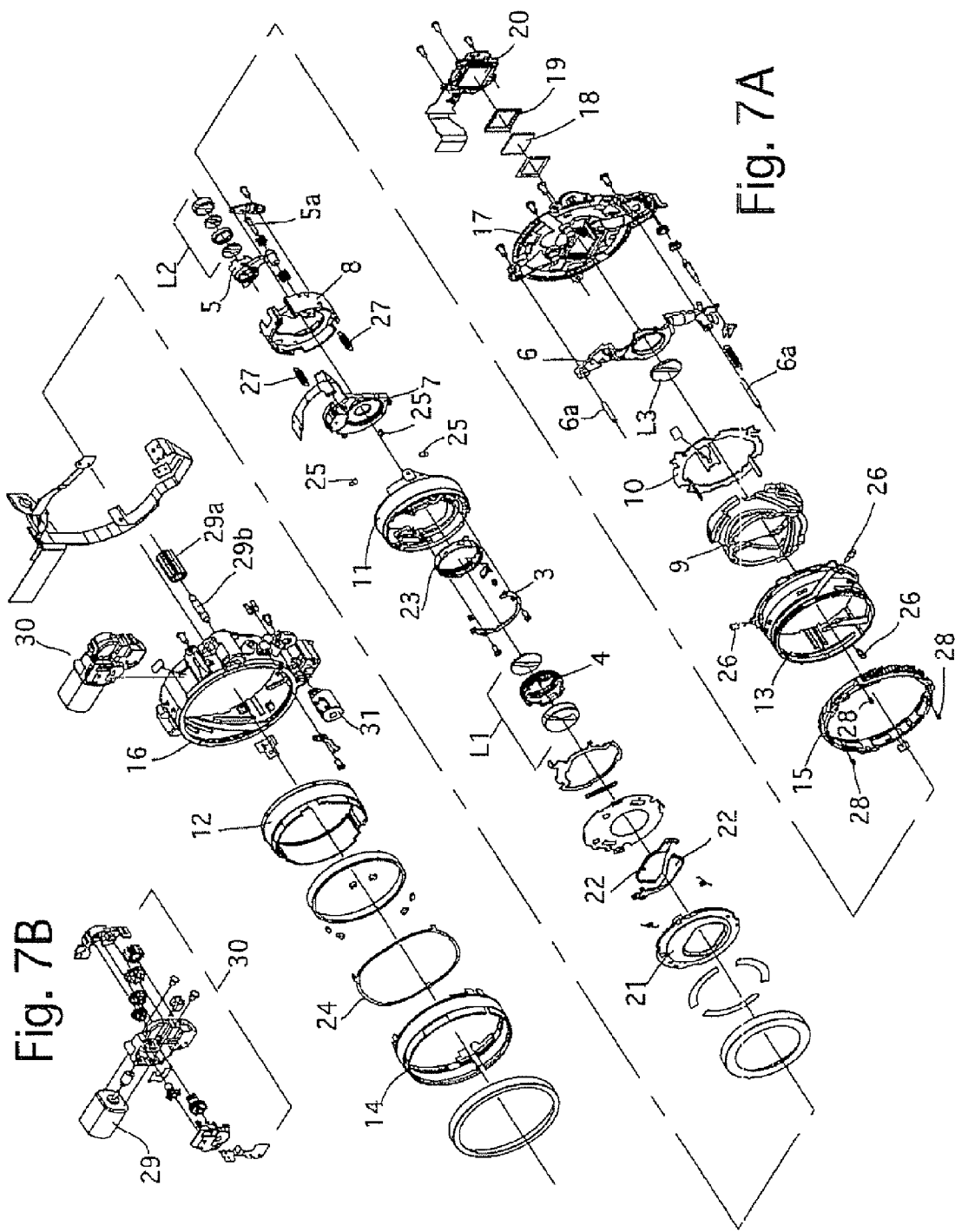
FIG. 7A is an exploded perspective view of the zoom lens shown in FIG. 1.
FIG. 7B is an exploded perspective view of a zoom gear unit shown in FIG. 7A.

The zoom lens 40 is provided in the stationary barrel 16 with a third lens frame 6 which supports and holds the third lens group L3 and which is guided linearly in a direction parallel to the photographing optical axis Z along a pair of parallel guide shafts 6a (see FIG. 7A) which extend parallel to the photographing optical axis Z. Due to this structure, the third lens frame 6 can be linearly moved forward and rearward by a driving force of an AF motor 31. Front and rear ends of each guide shaft 6a are fixed to the stationary barrel 16 and the CCD support plate 17, respectively.

The zoom lens 40 is provided on top of the stationary barrel 16 with a zoom gear unit 30 which is supported by the stationary barrel 16. The zoom gear unit 30 is composed of a zoom motor 29 and a reduction gear box containing a reduction gear train (see FIG. 7B). Via this reduction gear train, a driving force of the zoom motor 29 is transferred to a zoom gear 29a which is supported by the stationary barrel 16 to be rotatable on a zoom gear shaft 29b extending parallel to the photographing optical axis Z.

Figure 10:
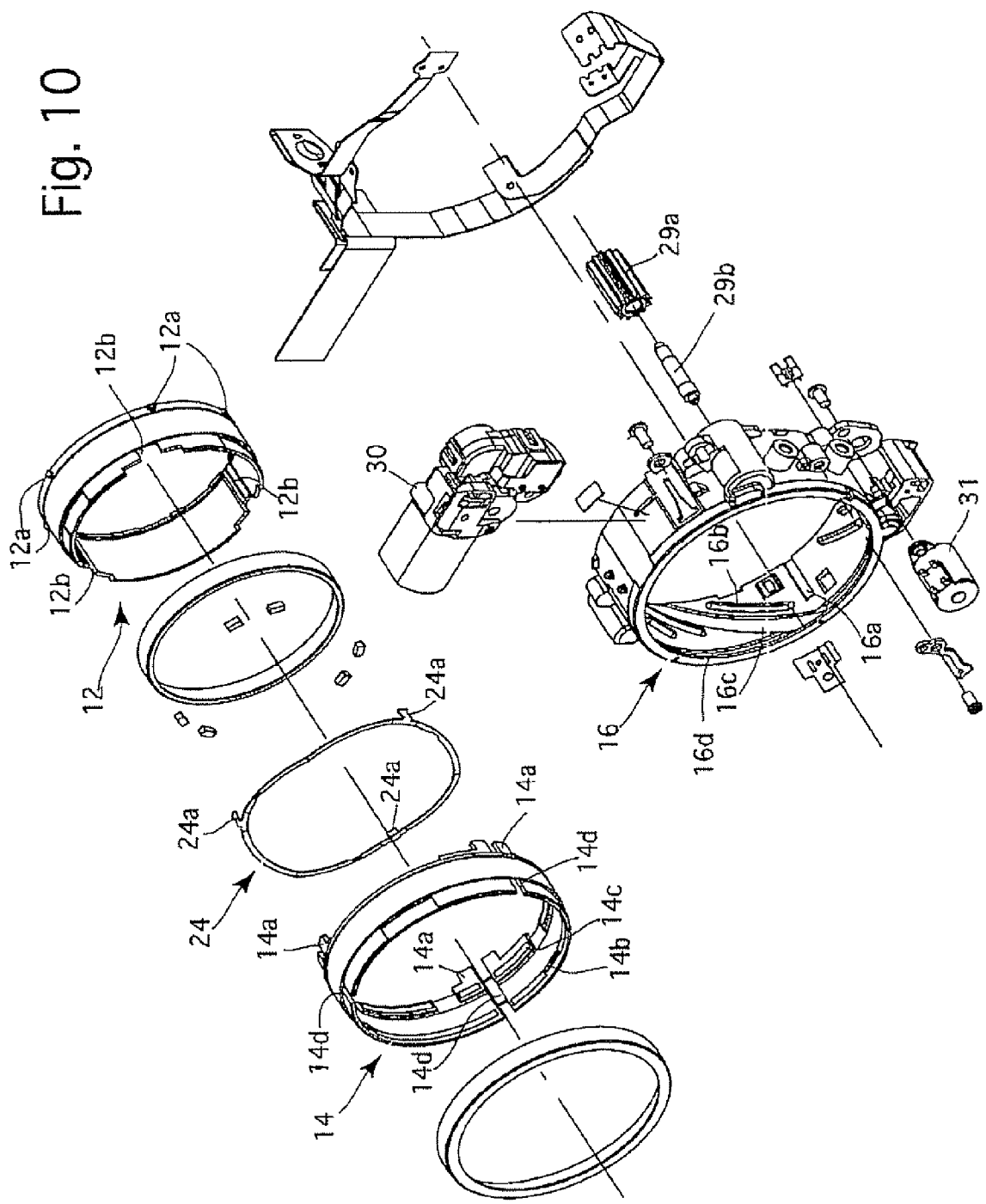
FIG. 10 is an exploded perspective view of another portion of the zoom lens shown in FIG. 7A.

As shown in FIG. 10, the stationary barrel 16 is provided on an inner peripheral surface thereof with a set of three linear guide grooves 16a, an internal helicoid 16b, a set of three inclined grooves 16c and a set of three rotational guide grooves (circumferential grooves) 16d. The set of three linear guide grooves 16a extend parallel to the photographing optical axis Z. The thread of the internal helicoid 16b extends in a direction inclined with respect to both the optical axis direction and a circumferential direction of the stationary barrel 16. The set of three inclined grooves 16c extend parallel to the thread of the internal helicoid 16b. The set of three rotational guide grooves 16d are formed in the vicinity of a front end of the inner peripheral surface of the stationary barrel 16 to extend in a circumferential direction of the stationary barrel 16 to be communicably connected to the front ends of the set of three inclined grooves 16c, respectively. The internal helicoid 16b is not formed on a specific front area of the inner peripheral surf ace of the stationary barrel 16 which is positioned immediately behind the set of three rotational guide grooves 16d.

Figure 8:
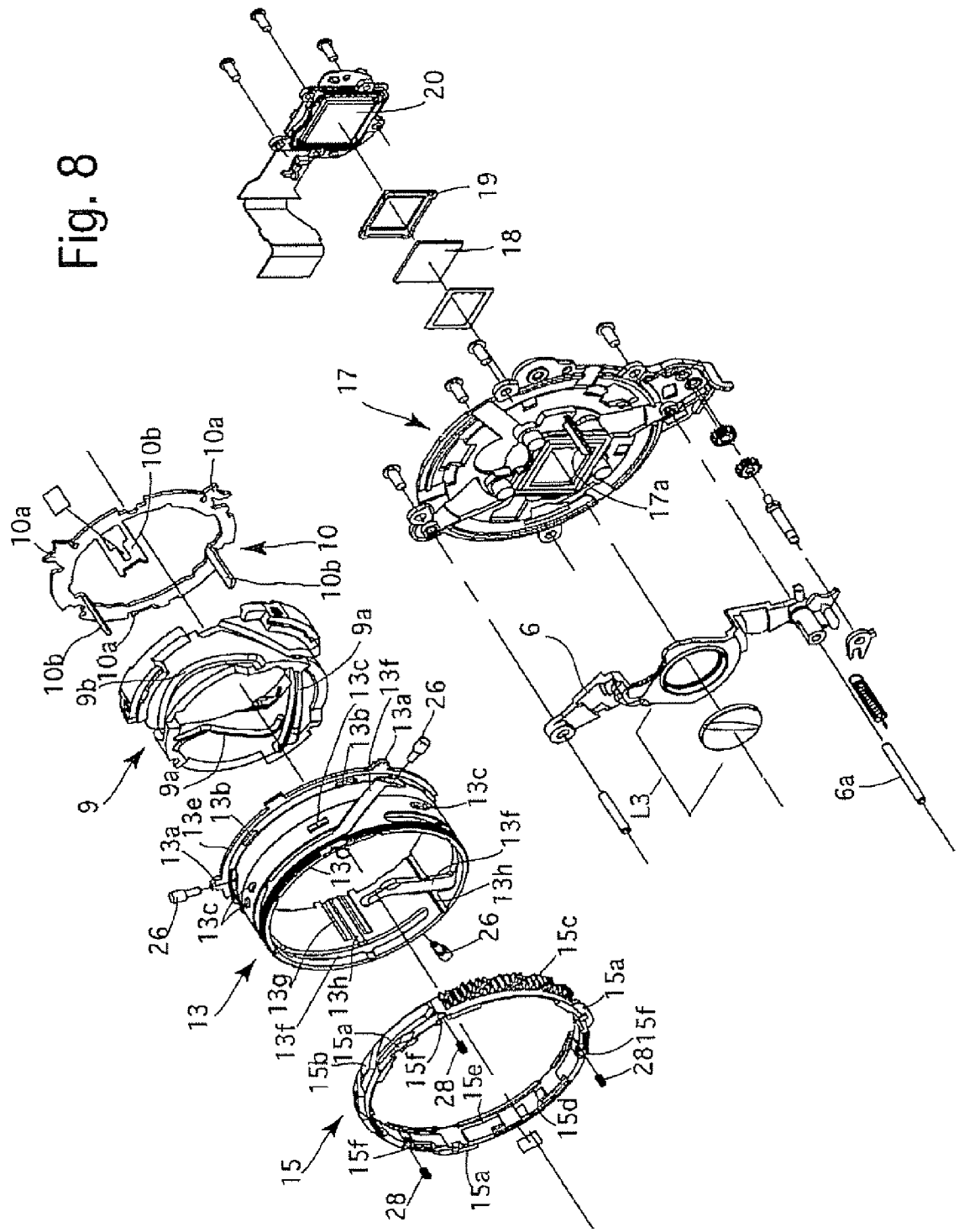
FIG. 8 is an enlarged perspective view of a portion of the zoom lens shown in FIG. 7A.

The zoom lens 40 is provided inside the stationary barrel 16 with a helicoid ring 15 (see FIG. 8). The helicoid ring 15 is provided on an outer peripheral surface thereof with a set of three rotational guide projections 15a and an external helicoid 15b. The set of three rotational guide projections 15a are respectively engaged in the set of three inclined grooves 16c or the set of three rotational guide grooves 16d of the stationary ring 16, while the external helicoid 15b is engaged with the internal helicoid 16b of the stationary ring 16. The helicoid ring 15 is provided on the thread of the external helicoid 15b with an annular gear 15c which is in mesh with the zoom gear 29a. Therefore, when a rotation of the zoom gear 29a is transferred to the annular gear 15c, the helicoid ring 15 moves forward or rearward in the optical axis direction while rotating about the photographing optical axis Z within a predetermined range in which the external helicoid 15b remains in mesh with the internal helicoid 16b. A forward movement of the helicoid ring 15 which brings the rear end of the external helicoid 15b to a point beyond the front end of the internal helicoid 16b causes the external helicoid 15b to be disengaged from the internal helicoid 16b so that the helicoid ring 15 rotates about the photographing optical axis Z without moving in the optical axis direction relative to the stationary barrel 16 by engagement of the set of three rotational guide projections 15a with the set of three rotational guide grooves 11d. In a state where the internal helicoid 16b is in mesh with the external helicoid 15b, the set of three inclined grooves 16c serve as clearance grooves for preventing the set of three rotational guide projections 15a and the stationary barrel 16 from interfering with each other. Namely, in a state where the internal helicoid 16b is in mesh with the external helicoid 15b, the set of three rotational guide projections 15a are positioned in the set of three inclined grooves 16c, respectively, so that the set of three rotational guide projections 15a and the internal helicoid 16b do not interfere with each other.

As can be appreciated from FIGS. 1 through 3, the zoom lens 40 is a telescopic type having three external telescoping barrels; a first movable barrel 14, a second movable barrel 12 and a third movable barrel (relatively movable member) 11, which are concentrically arranged about the photographing optical axis Z. The helicoid ring 15 is provided, on an inner peripheral surface thereof at three different circumferential positions on the helicoid ring 15, with three rotation transfer recesses 15d, the front ends of which are open at the front end of the helicoid ring 15. The first movable barrel 14 is provided, at corresponding three different circumferential positions thereon, with three pairs of rotation transfer projections 14a which project rearward from the rear end of the first movable barrel 14 to be engaged in the three rotation transfer recesses 15d from the front of the helicoid ring 15, respectively. The three pairs of rotation transfer projections 14a and the three rotation transfer recesses 11d are respectively engaged with each other to be movable relative to each other in the direction of the photographing optical axis Z and not to be rotatable relative to each other about the photographing optical axis Z (so that rotation of the helicoid ring 15 can be transferred to the first movable barrel 14). Namely, the first movable barrel 14 and the helicoid ring 15 rotate integrally. The zoom lens 40 is provided between the first movable barrel 14 and the helicoid ring 15 with three separating biasing springs 28 which are installed between the first movable barrel 14 and the helicoid ring 15 in a compressed fashion to bias the first movable barrel 14 and the helicoid ring 15 in opposite directions away from each other in the photographing optical axis direction. The three separating biasing springs 28 are accommodated in three accommodation holes (bottomed holes) 15f, the front ends of which are open at the front end of the helicoid ring 15.

The first movable barrel 14 is provided on an inner peripheral surface thereof with a set of three inward projections 14b which project radially inward, a circumferential groove 14c and a set of three rotation transfer grooves 14d which extend parallel to the photographing optical axis Z. The set of three inward projections 14b are arranged at different circumferential positions. The circumferential positions of the three rotation transfer grooves 14d correspond to the three pairs of rotation transfer projections 14a, respectively, and the rear end of each rotation transfer groove 14d passes between the associated pair of rotation transfer projections 14a to be open rearward. The helicoid ring 15 is provided on an inner peripheral surface thereof with a circumferential groove 15e.

The zoom lens 40 is provided inside the first movable barrel 14 and the helicoid ring 15 with a linear guide ring 13. The linear guide ring 13 is provided on an outer peripheral surface thereof with a set of three linear guide projections 13a, a first plurality of radial outward projections 13b, a second plurality of radial outward projections 13c and a circumferential groove 13d, in that order from the rear of the linear guide ring 13 in the optical axis direction. The set of three linear guide projections 13a project radially outwards. The first plurality of radial outward projections 13b are arranged at different circumferential positions, while the second plurality of radial outward projections 13c are arranged at different circumferential positions. The linear guide ring 13 is provided at the rear end thereof with an outer annular flange 13e from which the three linear guide projections 13a project radially outwards. The linear guide ring 13 is guided linearly in the optical axis direction without rotating by the engagement of the set of three linear guide projections 13a with the set of three linear guide grooves 16a of the stationary barrel 16. The first movable barrel 14 is coupled to the linear guide ring 13 to be rotatable relative thereto by the engagement of the set of three inward projections 14b with the circumferential groove 13d. The helicoid ring 15 is coupled to the linear guide ring 13 to be rotatable relative thereto by the engagement of the first plurality of radial outward projections 13b with the circumferential groove 15e.

The linear guide ring 13 is provided with a set of three roller-guide through-slots (through-grooves) 13f which radially extend through the linear guide ring 13. Each through slot 13f is provided, at the opposite ends thereof in the optical axis direction, with a front circumferential slot portion and a rear circumferential slot portion, each of which extends in a circumferential direction of the linear guide ring 13, and is further provided between the front circumferential slot portion and the rear circumferential slot portion with a lead slot portion (inclined groove portion) which extends obliquely with respect to both the optical axis direction and the front and rear circumferential slot portions. The zoom lens 40 is provided with a cam ring 9, and a set of three roller followers 26 fixed to an outer peripheral surface of the cam ring 9 are engaged in the set of three guide through-slots 13f, respectively. The set of three roller followers 26 are further engaged in the set of three rotation transfer grooves 14d through the set of three guide through-slots 13f, respectively. The zoom lens 40 is provided in the vicinity of the first movable barrel 14 with an annular leaf spring (biasing spring) 24. The annular leaf spring 24 is provided at different circumferential positions thereof with three roller biasing lugs 24a which project rearward to be engaged in front end portions of the set of three rotation transfer grooves 14d, respectively. The annular leaf spring 24 presses the set of three roller followers 26 rearward via the roller biasing lugs 24a to eliminate backlash between the set of three roller followers 26 and the set of three guide through-slots 13f when the set of three roller followers 26 are engaged in the front circumferential slot portions of the set of three roller-guide through-slots 13f, respectively.

Figure 4:
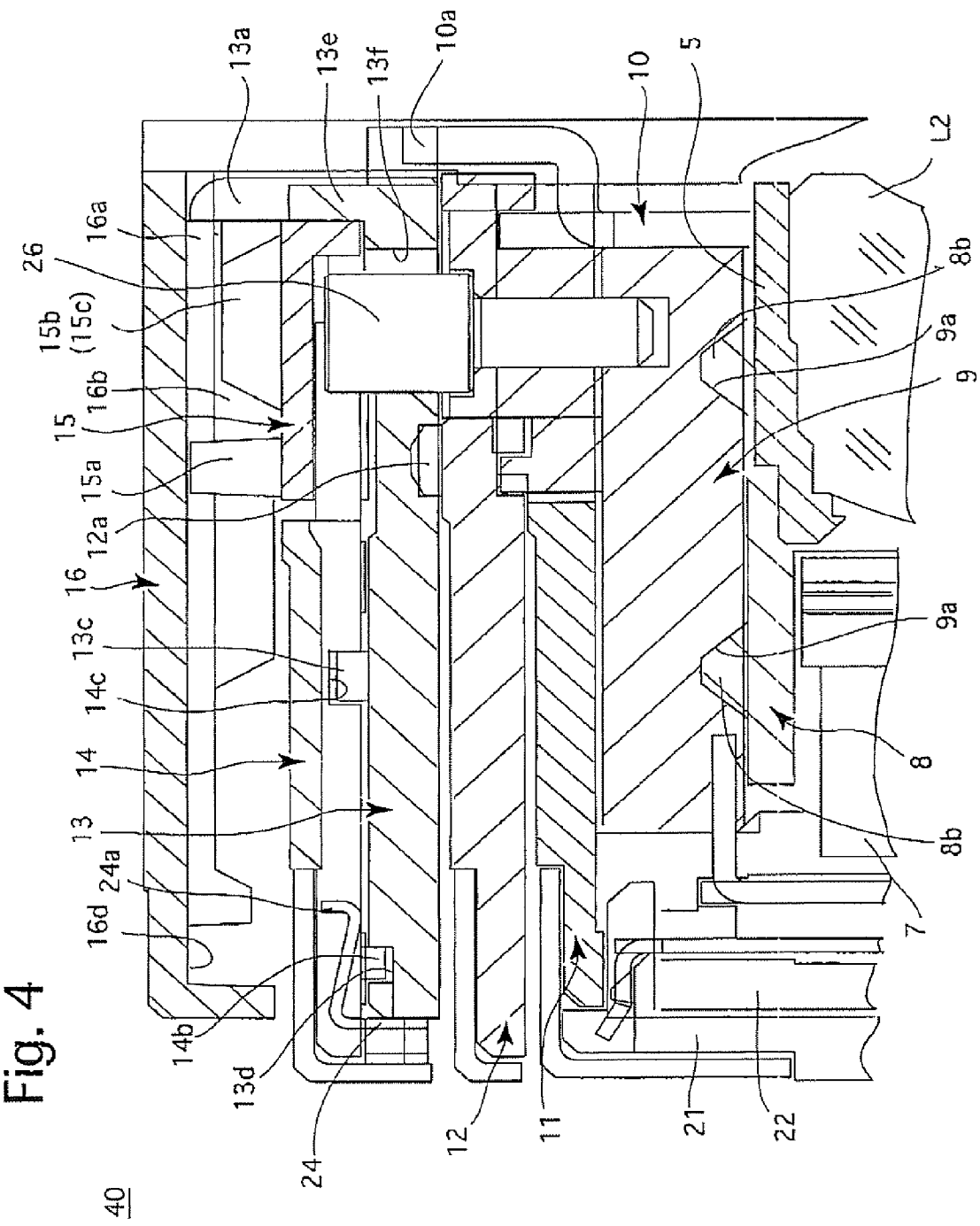
FIG. 4 is a longitudinal sectional view of a portion of the zoom lens in the retracted state.
Figure 5:
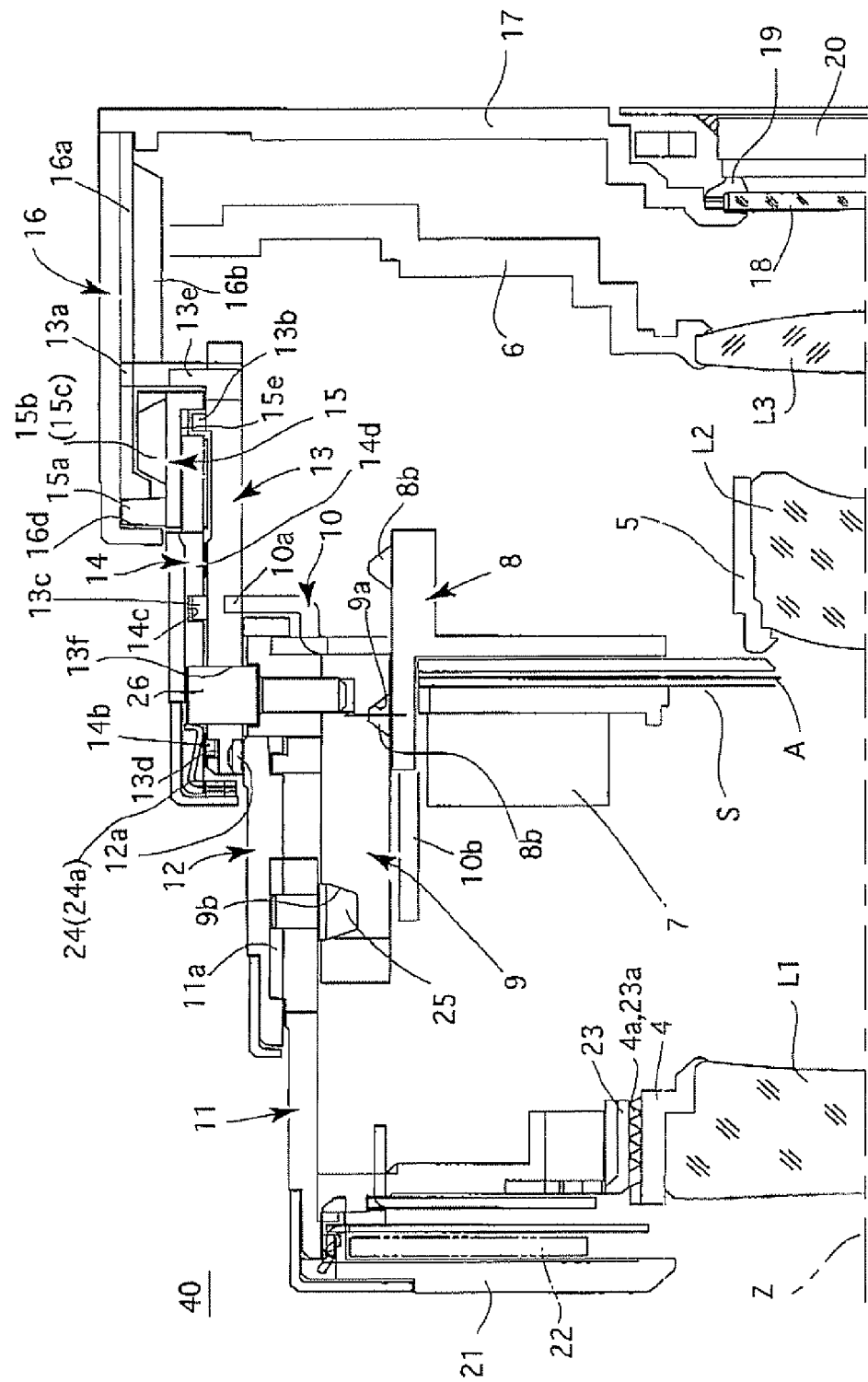
FIG. 5 is a longitudinal sectional view of an upper half of the zoom lens shown in FIG. 1 from the optical axis thereof at the wide-angle extremity.
Figure 6:
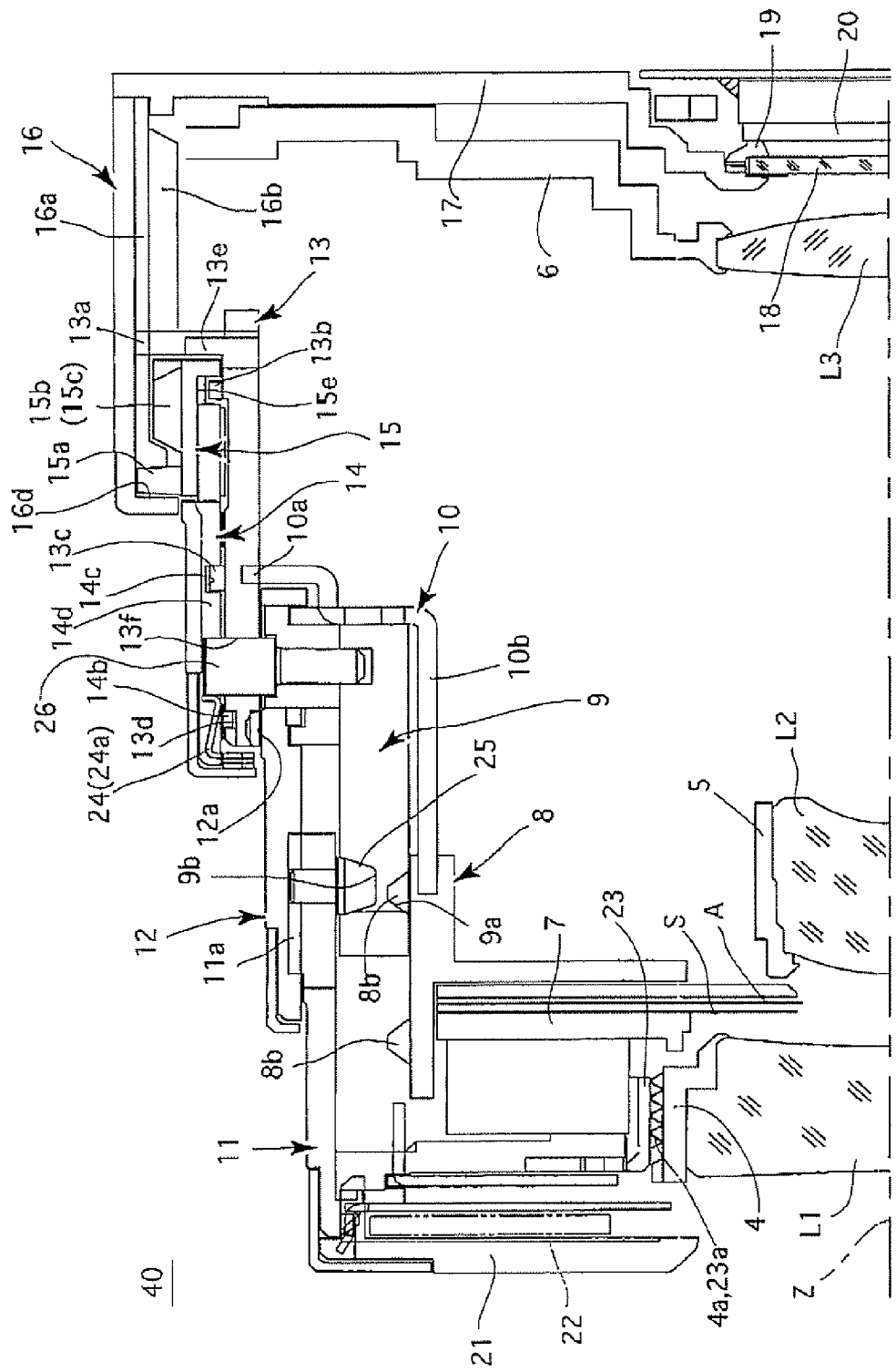
FIG. 6 is a longitudinal sectional view of an upper half of the zoom lens shown in FIG. 1 from the optical axis thereof at the telephoto extremity.

Advancing operations of the cam ring 9, the linear guide ring 13, the first movable barrel 14 and the helicoid ring 15 from the stationary barrel 16 will be discussed hereinafter. When the zoom lens 40 is in the retracted state as shown in FIGS. 1 and 4, rotating the zoom gear 29a in a lens barrel advancing direction by the zoom motor 29 causes the helicoid ring 15 to move forward while rotating due to the engagement of the internal helicoid 16b with the external helicoid 15b. This rotation of the helicoid ring 15 causes the first movable barrel 14 to move forward together with the helicoid ring 15 while rotating together with the helicoid ring 15, and further causes the linear guide ring 13 to move forward together with the helicoid ring 15 and the first movable barrel 14 because the helicoid ring 15 and the first movable barrel 14 are coupled to each other indirectly via the linear guide ring 13. In addition, the torque (rotating force) of the first movable barrel 14 is transferred to the cam ring 9 via the engagement of the set of three roller followers 26 with the set of three rotation transfer grooves 14d when the first movable barrel 14 rotates. Thereupon, the cam ring 9 moves forward while rotating relative to the linear guide ring 13 in accordance with contours of the lead slot portions of the set of three through-slots 13f because the set of three roller followers 26 are also engaged with the set of three guide through-slots 13f, respectively. Since the linear guide ring 13 itself has linearly moved forward together with the helicoid ring 15 and the first movable barrel 14 as described above, the cam ring 9 moves forward in the optical axis direction by a resultant amount of movement corresponding to the sum of the amount of the forward movement of the linear guide ring 13 (and the helicoid ring 15 and the first movable barrel 14) and the amount of the forward movement of the cam ring 9 via the engagement of the set of three roller followers 26 with the lead slot portions of the set of three through-slots 13f, respectively.

The above described rotating-advancing operations are performed only when the external helicoid 15b and the internal helicoid 16b are engaged with each other. At this time, the set of three rotational guide projections 15a of the helicoid ring 15 move along the set of three inclined grooves 16c, respectively. When the helicoid ring 15 is moved forward to a point in the vicinity of the point at the wide-angle extremity, the external helicoid 15b and the internal helicoid 16b are disengaged from each other so that the set of three rotational guide projections 15a move from the set of three inclined grooves 16c into the set of three rotational guide grooves 16d, respectively. Upon this disengagement of the external helicoid 15b from the internal helicoid 16b, the helicoid ring 15 does not move in the optical axis direction relative to the stationary barrel 16 even if rotating, and accordingly, the helicoid ring 15 and the first movable barrel 14 rotate at respective axial fixed positions thereof without moving in the optical axis direction due to the engagement of the set of three rotational guide projections 15a with the set of three rotational guide grooves 16d. The set of three roller followers 26 enter the front circumferential slot portions of the set of three guide through-slots 13f from the lead slot portions of the set of three guide through-slots 13f almost simultaneously with the moment at which the set of three rotational guide projections 15a slide into the set of three rotational guide grooves 16d from the set of three inclined grooves 16c, respectively Thereupon, the cam ring 9 enters a state in which the cam ring 9 does not receive any moving force to move forwards so that the cam ring 9 rotates at an axial fixed position thereof without moving in the optical axis direction in accordance with rotation of the first movable barrel 14.

Rotating the zoom gear 29a in a lens barrel retracting direction thereof via the zoom motor 29 causes the aforementioned movable elements (which includes the cam ring 9, the linear guide ring 13, the first movable barrel 14 and the helicoid ring 15) of the zoom lens 40 to operate in the reverse manner to the above described advancing operations. In this reverse operation, the continuation of rotation of the helicoid ring 15 until the set of three roller followers 26 enter the rear circumferential slot portions of the set of three guide through-slots 13f from the lead slot portions of the set of three guide through-slots 13f, respectively, causes the aforementioned movable elements to move rearward to their respective retracted positions as shown in FIGS. 1 through 4.

The structure of a portion of the zoom lens 40 which is driven via the cam ring 9 will be discussed hereinafter. As shown in FIG. 8, the linear guide ring 13 is provided on an inner peripheral surface thereof with a set of three pairs of first linear guide grooves 13g which are formed at different circumferential positions to extend parallel to the photographing optical axis Z, and a set of six second linear guide grooves 13h which are formed at different circumferential positions to extend parallel to the photographing optical axis Z. Each alternate groove of the six second linear guide grooves 13h is positioned in between one pair of first linear guide grooves 13g, i.e., each pair of first linear guide grooves 13g are respectively positioned on the opposite sides of the associated second linear guide groove 13h in a circumferential direction of the linear guide ring 13. The zoom lens 40 is provided inside of the linear guide ring 13 with a second-lens-group linear guide ring 10. The second lens group guide ring 10 is provided on an outer edge thereof with a set of three bifurcated projections 10a (see FIG. 8) which project radially outwards from a ring portion of the second lens group guide ring 10. Each bifurcated projection 10a is provided at a radially outer end thereof with a pair of radial projections which are respectively engaged in the associated pair of first linear guide grooves 13g. On the other hand, a set of six radial projections 12a (see FIG. 10), which are formed on an outer peripheral surface of the second movable barrel 12 at a rear end thereof and project radially outwards, are engaged in the set of six second linear guide grooves 13h to be slidable therealong, respectively. Therefore, each of the second lens group guide ring 10 and the second movable barrel 12 is guided linearly in the optical axis direction via the linear guide ring 13.

Figure 9:
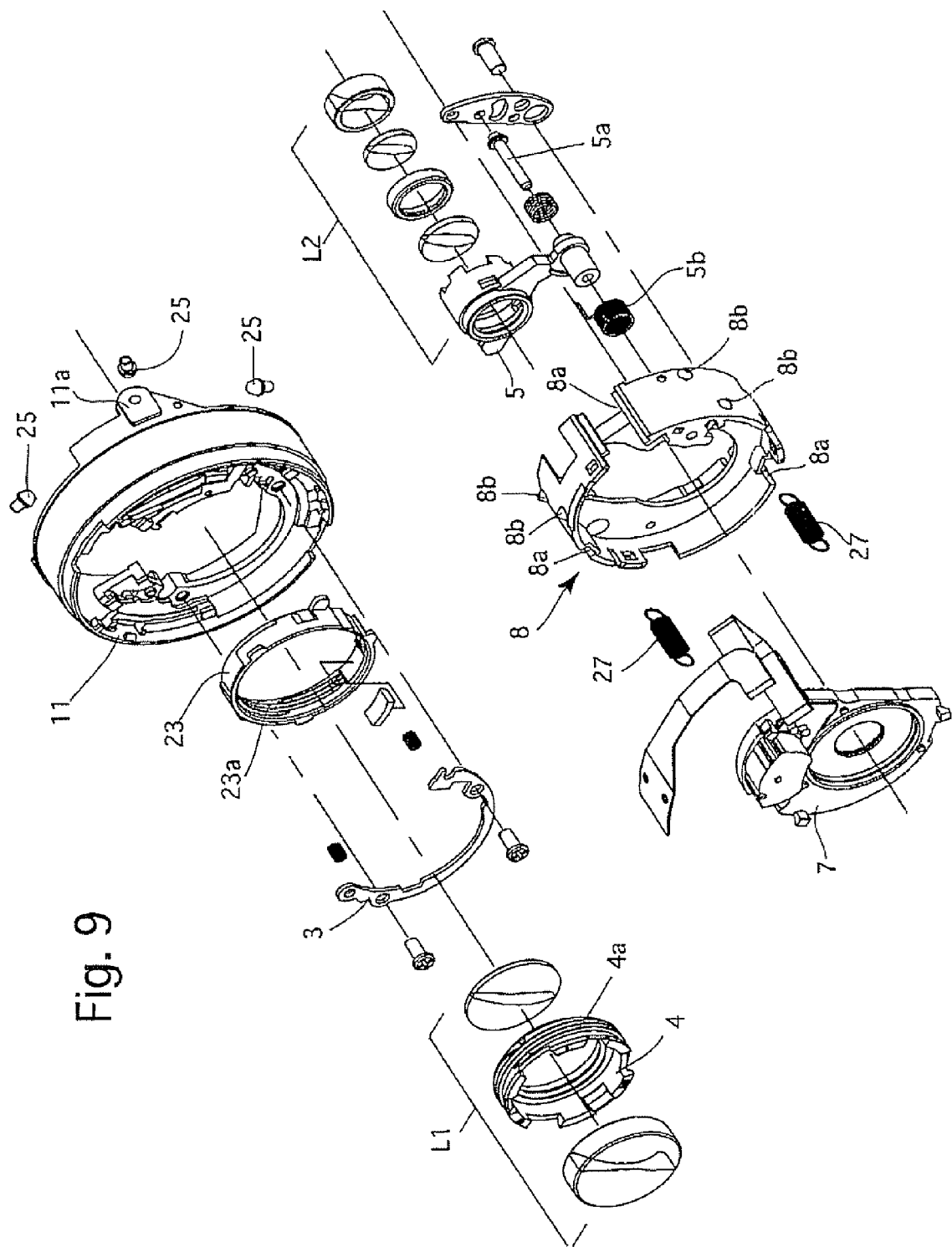
FIG. 9 is an exploded perspective view of another portion of the zoom lens shown in FIG. 7A.

The second lens group guide ring 10 is coupled to the cam ring 9 to be rotatable relative thereto and to be movable together with the cam ring 9 in the optical axis direction. The second lens group guide ring 10 is provided on the ring portion thereof with a set of three linear guide keys 10b which project forward from the ring portion to extend parallel to one another. The zoom lens 40 is provided radially inside the cam ring 9 with a second lens group moving frame (relatively movable member) 8 having a set of three linear guide grooves 8a (see FIG. 9) in which the set of three linear guide keys 10b of the second lens group guide ring 10 are engaged, respectively, so that the second lens group moving frame 8 is guided linearly in the optical axis direction by the second lens group guide ring 10 via the engagement of the set of three linear guide keys 10b with the set of three linear guide grooves 8a. The cam ring 9 is provided on an inner peripheral surface thereof with a set of three inner cam grooves 9a in which a set of three front cam followers 8b or a set of three rear cam followers 8b formed on an outer peripheral surface of the second lens group moving frame 8 are engaged, respectively. Since the second lens group moving frame 8 is guided linearly in the optical axis direction by the second lens group guide ring 10, a rotation of the cam ring 9 causes the second lens group moving frame 8 to move in the optical axis direction in a predetermined moving manner in accordance with contours of the set of three inner cam grooves 9a.

The zoom lens 40 is provided inside the second lens group moving frame 8 with a second lens frame (radially-retractable lens frame/swingable frame) 5 which supports and holds the second lens group L2. The second lens frame 5 is pivoted about a pivot shaft 5a (see FIG. 9) which is fixed to the second lens group moving frame 8 to extend parallel to the photographing optical axis Z. The pivot shaft 5a is positioned a predetermined distance away from the photographing optical axis Z, and extends parallel to the photographing optical axis Z. The second lens frame 5 is swingable about the pivot shaft 5a between an inserted position (on-axis position) shown in FIGS. 2 and 3 where the optical axis of the second lens group L2 coincides with the photographing optical axis Z, and a radially-retracted position (off-axis position) shown in FIG. 1 where the second lens group L2 is positioned above the photographing optical axis Z. The second lens frame 5 is continuously spring-biased to rotate toward the aforementioned inserted position by a torsion coil spring 5b (see FIG. 9). The second lens frame 5 moves together with the second lens group moving frame 8 in the optical axis direction. The CCD support plate 17 is provided with a position-control cam bar 17a (see FIG. 8) which projects forward from the CCD Support plate 17. If the second lens group moving frame 8 moves rearward in a retracting direction to approach the CCD support plate 17, the position-control cam bar 17a presses the second lens frame 5 to rotate the second lens frame 5 to the radially-retracted position against the spring force of the torsion coil spring 5b that biases the second lens frame 5.

The second movable barrel 12 is provided on an inner peripheral surface thereof with a set of three linear guide grooves 12b (see FIG. 10) which are formed at different circumferential positions and extend parallel the photographing optical axis Z. The third movable barrel 11 is provided, on an outer peripheral surface thereof in the vicinity of the rear end of the third movable barrel 11, with a set of three engaging protrusions 11a (see FIG. 9) which are slidably engaged in the set of three linear guide grooves 12b of the second movable barrel 12, respectively. Accordingly, the third movable barrel 11 is guided linearly in the optical axis direction without rotating via the linear guide ring 13 and the second movable barrel 12. The second movable barrel 12 is coupled to the cam ring 9 to be rotatable relative thereto and to be integrally movable with the cam ring 9 in the optical axis direction. On the other hand, the third movable barrel 11 is provided on an inner peripheral surface thereof with a set of three cam followers 25 which project radially inwards, while the cam ring 9 is provided on an outer peripheral surface thereof with a set of three outer cam grooves 9b in which the set of three cam followers 25 are slidably engaged, respectively, so that the third movable barrel 11 moves forward and rearward in the optical axis direction in accordance with rotation of the cam ring 9.

The zoom lens 40 is provided inside of the third movable barrel 11 with a first lens frame 4 which is supported by the third movable barrel 11 via a first lens frame holder 23. The first lens frame 4 holds the first lens group L1 and is provided on an outer peripheral surface of the first lens frame 4 with a male screw thread 4a. The first lens frame holder 23 is provided on an inner peripheral surface thereof with a female screw thread 23a which is screw-engaged with the male screw thread 4a. A combination of the first lens frame 4 and the first lens frame holder 23 is positioned inside of the third movable barrel 11 and supported thereby. A semicircular retainer 3 which is fixed to the third movable barrel 11 by set screws operates to prevent the first lens frame 4 from rotating relative to the first lens frame holder 23 to thereby prevent the first lens frame 4 from moving in the optical axis direction relative to the first lens frame holder 23 after the position of the first lens frame 4 relative to the first lens frame holder 23 in the optical axis direction is adjusted during assembly of the zoom lens 40 via the male screw thread 4a and the female screw thread 23a.

The third movable barrel 11 that supports the first lens group L1 and the second lens group moving frame 8 which supports the second lens group L2 are biased in directions to approach each other in the optical axis direction by a pair of extension biasing springs (biasing device/extension coil springs) 27.

The zoom lens 40 is provided between the first lens group L1 and the second lens group L2 with a shutter unit 7 including the shutter S and the diaphragm A. The shutter unit 7 is positioned radially inside of the second lens group moving frame 8 and is fixed thereto.

The zoom lens 40 is provided in the vicinity of the front end of the third movable barrel 11 with a lens barrier support ring 21, and is further provided immediately behind the lens barrier support ring 21 with a lens barrier 22 which is supported by the third movable barrel 11 via the lens barrier support ring 21. The lens barrier 22 includes a pair of barrier blades each of which is pivoted about an associated pivot which is positioned off the optical axis Z and parallel thereto. The lens barrier 22 shuts the frontmost photographing aperture of the zoom lens 40 for the protection of the first lens group L1 when the zoom lens 40 is in the retracted state shown in FIG. 1, while the lens barrier 22 opens the same photographing aperture when the zoom lens 40 is in a ready-to-photograph state shown in FIGS. 2 and 3.

Operations of the zoom lens 40 having the above described structure will be discussed hereinafter. Note that operations of the zoom lens 40 during the advancing stage of the cam ring 9 from the retracted position thereof to a state where the cam ring 9 rotates at the axial fixed position thereof have been described above and will thus be hereinafter only discussed briefly.

In the state shown in FIG. 1, in which the zoom lens 40 is in the retracted state, the zoom lens 40 is fully retracted in the camera body. In this state, upon a main switch of the camera being turned ON, the zoom motor 29 drives the zoom gear 29a in the lens barrel advancing direction and this rotation of the zoom gear 29a causes a combination of the helicoid ring 15 and the first movable barrel 14 to move forward while rotating due to the engagement of the internal helicoid 16b with the external helicoid 15b, and further causes the linear guide ring 13 to move forward linearly together with the first movable barrel 14 and the helicoid ring 15. At this time, the cam ring 9 to which torque is transferred from the first movable barrel 14 moves forward in the optical axis direction by a resultant amount of movement corresponding to the sum of the amount of the forward movement of the linear guide ring 13 and the amount of the forward movement of the cam ring 9 due to the engagement of the set of three roller followers 26 with the lead slot portions of the set of three through-slots 13f respectively (i.e., due to a lead structure (which includes the set of three roller followers 26 and the lead slot portions of the slot of three through-slots 13f) provided between the cam ring 9 and the linear guide ring 13. Immediately after the helicoid ring 15 and the cam ring 9 are moved forward to their respective predetermined positions, their respective rotating-advancing mechanisms (helicoid/lead mechanisms) are released so that the helicoid ring 15 and the cam ring 9 only rotate about the photographing optical axis Z without moving in the optical axis direction.

A rotation of the cam ring 9 causes the second lens group moving frame 8, which is positioned inside of the cam ring 9 and guided linearly in the optical axis direction without rotating by the second lens group guide ring 10, to move in the optical axis direction with respect to the cam ring 9 in a predetermined moving manner due to the engagement of the set of three inner cam grooves 9a with the set of three front cam followers 8b or the set of three rear cam followers 8b, respectively. In the state shown in FIG. 1 in which the zoom lens 40 is in the retracted state, the second lens frame 5, which is positioned in the second lens group moving frame 8, has rotated about the pivot shaft 5a to be held in the radially-retracted position above the photographing optical axis Z by the position-control cam bar 17a. During the movement of the second lens group moving frame 8 from the retracted position to a position in the zooming range, the second lens frame 5 is disengaged from the position-control cam bar 17a to rotate about the pivot shaft 5a from the radially-retracted position to the photographing position, where the optical axis of the second lens group L2 coincides with the photographing optical axis Z by the spring force of the torsion coil spring 5b. Thereafter, the second lens frame 5 remains held in the photographing position until the zoom lens 40 is retracted to the retracted position shown in FIG. 1.

Additionally, when the cam ring 9 is rotated, the third movable barrel 11, which is positioned around the cam ring 9 and guided linearly in the optical axis direction without rotating via the second movable barrel 12, moves in the optical axis direction relative to the cam ring 9 in a predetermined moving manner due to the engagement of the set of three cam followers 25 with the set of three outer cam grooves 9b, respectively.

Therefore, an axial position of the first lens group L1 relative to the imaging area (the light-sensitive surface of the CCD image sensor 20) when the first lens group L1 is moved forward from the retracted position is determined by the sum of the amount of forward movement of the cam ring 9 relative to the stationary barrel 16 and the amount of movement of the third movable barrel 11 relative to the cam ring 9, and an axial position of the second lens group L2 relative to the imaging area when the second lens group L2 is moved forward from the retracted position is determined by the sum of the amount of forward movement of the cam ring 9 relative to the stationary barrel 16 and the amount of movement of the second lens group moving frame 8 relative to the cam ring 9. A zooming operation is carried out by moving the first and second lens groups L1 and L2 on the photographing optical axis 2 while changing the distance therebetween. When the zoom lens 40 is driven to advance from the retracted position shown in FIG. 1, the zoom lens 40 firstly moves forward to the position shown in FIG. 2, in which the zoom lens 40 is set at the wide-angle extremity. Subsequently, the zoom lens 40 moves forward to the position shown in FIG. 3, in which the zoom lens 40 is set at the telephoto extremity by a further rotation of the zoom motor 29 in a lens barrel advancing direction thereof.

As can be seen from FIGS. 2 and 3, in the present embodiment of the zoom lens 40, the distance between the first lens group L1 and the second lens group L2 is large when the zoom lens 40 is set at the wide-angle extremity. When the zoom lens 40 is set at the telephoto extremity, the first lens group L1 and the second lens group L2 move in directions to approach each other so that the distance therebetween becomes small. This variation of the distances between the first and second lens groups L1 and L2 for zooming operation is achieved by contours of the set of three inner cam grooves 9a and the set of three outer cam grooves 9b of the cam ring 9. In the zooming range between the wide-angle extremity and the telephoto extremity, the cam ring 9, the first movable barrel 14 and the helicoid ring 15 rotate at respective axial fixed positions thereof without moving in the optical axis direction.

When the first and second lens groups L1 and L2 are in the zooming range, a focusing operation is carried out by moving the third lens group L3 along the photographing optical axis Z by driving the AF motor 31 in accordance with an object distance.

Upon the main switch of the camera being turned OFF, the zoom motor 29 is driven in a lens barrel retracting direction so that the zoom lens 40 operates in the reverse manner to the above described advancing operation to retract the zoom lens 40 as shown in FIG. 1. During the course of this retracting movement of the zoom lens 40, the second lens frame 5 is rotated about the pivot shaft 5a to the radially-retracted position via the position-control cam bar 17a while moving rearward together with the second lens group moving frame 8. When the zoom lens 40 reaches the retracted position, the second lens group L2 is retracted into the space radially outside of the space in which the third lens group L3, the low-pass filter 18 and the CCD image sensor 20 are retracted, as shown in FIG. 1 (i.e., the second lens group L2 is radially retracted into an axial range substantially identical to an axial range in the optical axis direction in which the third lens group L3, the low-pass filter 18 and the CCD image sensor 20 are positioned). This structure of the zoom lens 40 for retracting the second lens group L2 in this manner reduces the length of the zoom lens 40 when the zoom lens 40 is fully retracted, thus making it possible to reduce the thickness of the camera body in the optical axis direction.

In the zoom lens 40, the first lens frame 4 that holds the first lens group L1 is supported by the third movable barrel 11 via the first lens frame holder 23, and the second lens frame 5 that holds the second lens group L2 is supported by the second lens group moving frame 8. The second lens group moving frame 8 and the third movable barrel 11 are linearly moved in the optical axis direction via camming actions of the set of three inner cam grooves 9a and the set of three outer cam grooves 9b of the cam ring 9, respectively, and backlash between the second lens group moving frame 8 and the cam ring 9 and backlash between the third movable barrel 11 and the cam ring 9 are eliminated by a backlash eliminating structure provided in the zoom lens 40 which will be discussed hereinafter.

Figure 11:
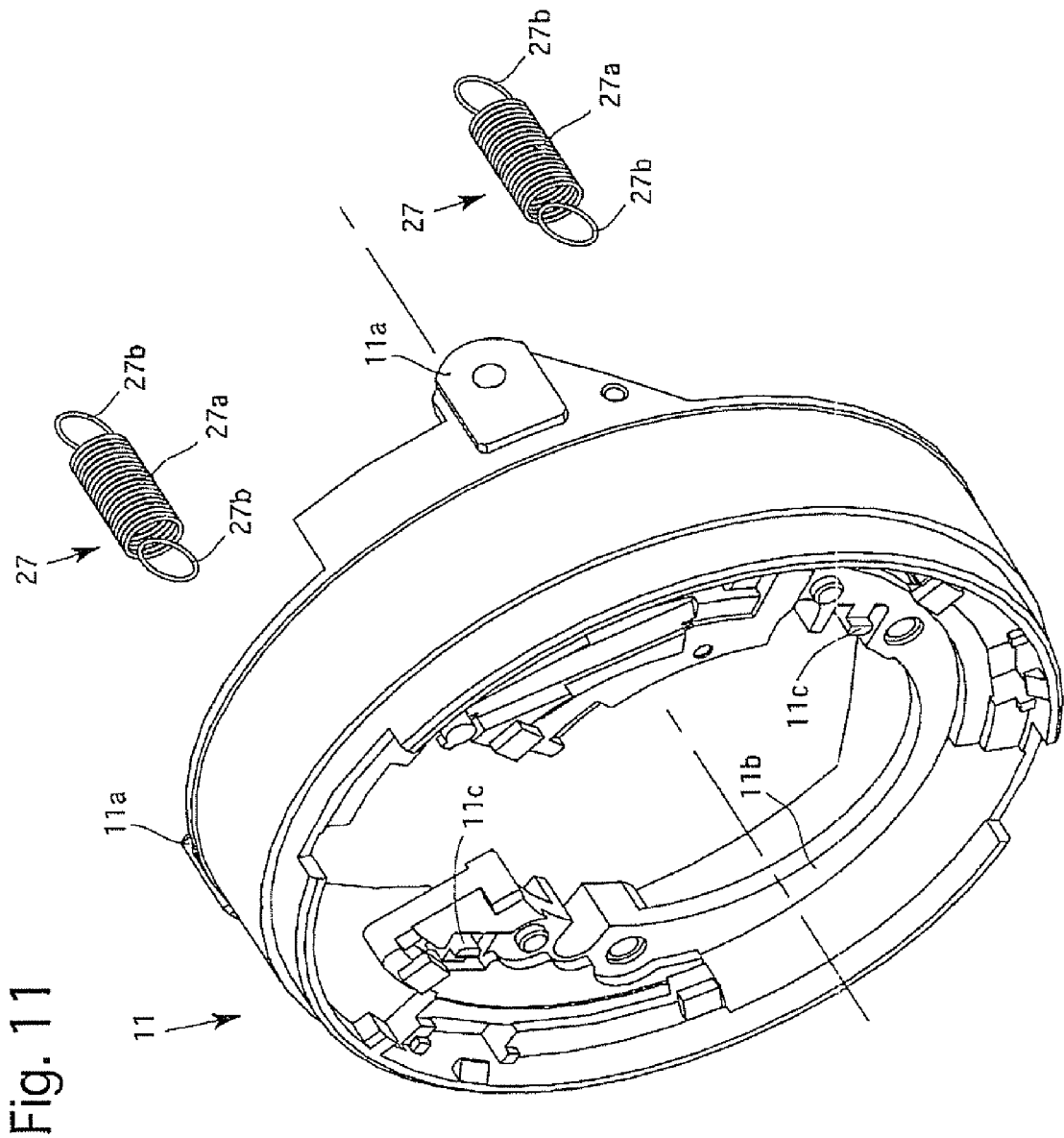
FIG. 11 is a perspective view of a third movable barrel and a pair of extension biasing springs which are shown in FIG. 7A, viewed obliquely from front thereof.

As shown in FIG. 11, the third movable barrel 11 is provided on an inner peripheral surf ace thereof with an annular inward flange 11b. The inward flange 11b is provided with a pair of spring-hooked projections 11c which are substantially symmetrically arranged with respect to the axis of the third movable barrel 11. Each spring-hooked projection 11c projects radially inwards from the radially outside of the inward flange 11b and the end of each spring-hooked projection 11c is bent forward to have a hook shape.

Figure 12:
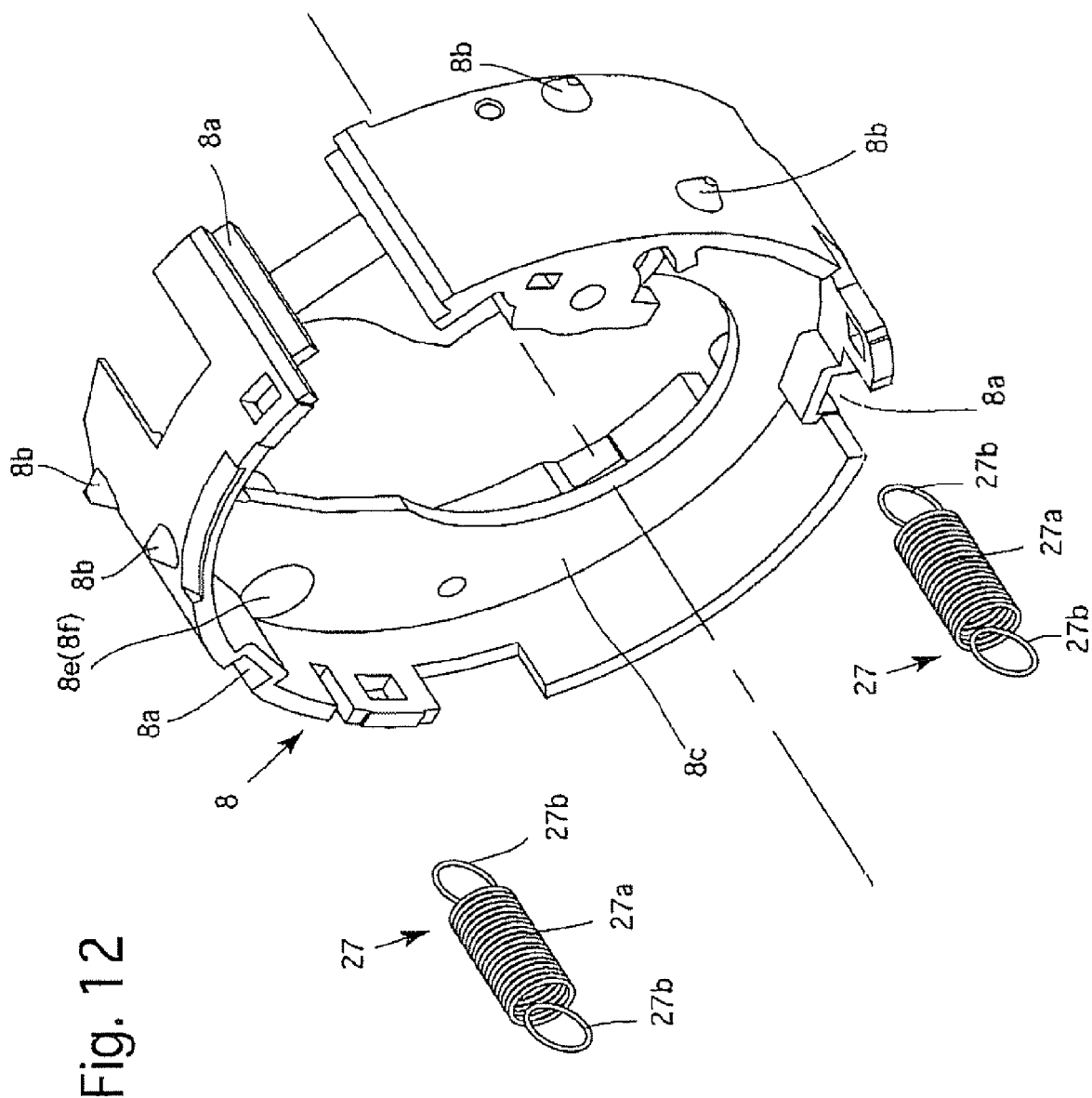
FIG. 12 is a perspective view of a second lens group moving frame and the pair of extension biasing springs which are shown in FIG. 7A, viewed obliquely from front thereof.
Figure 13:
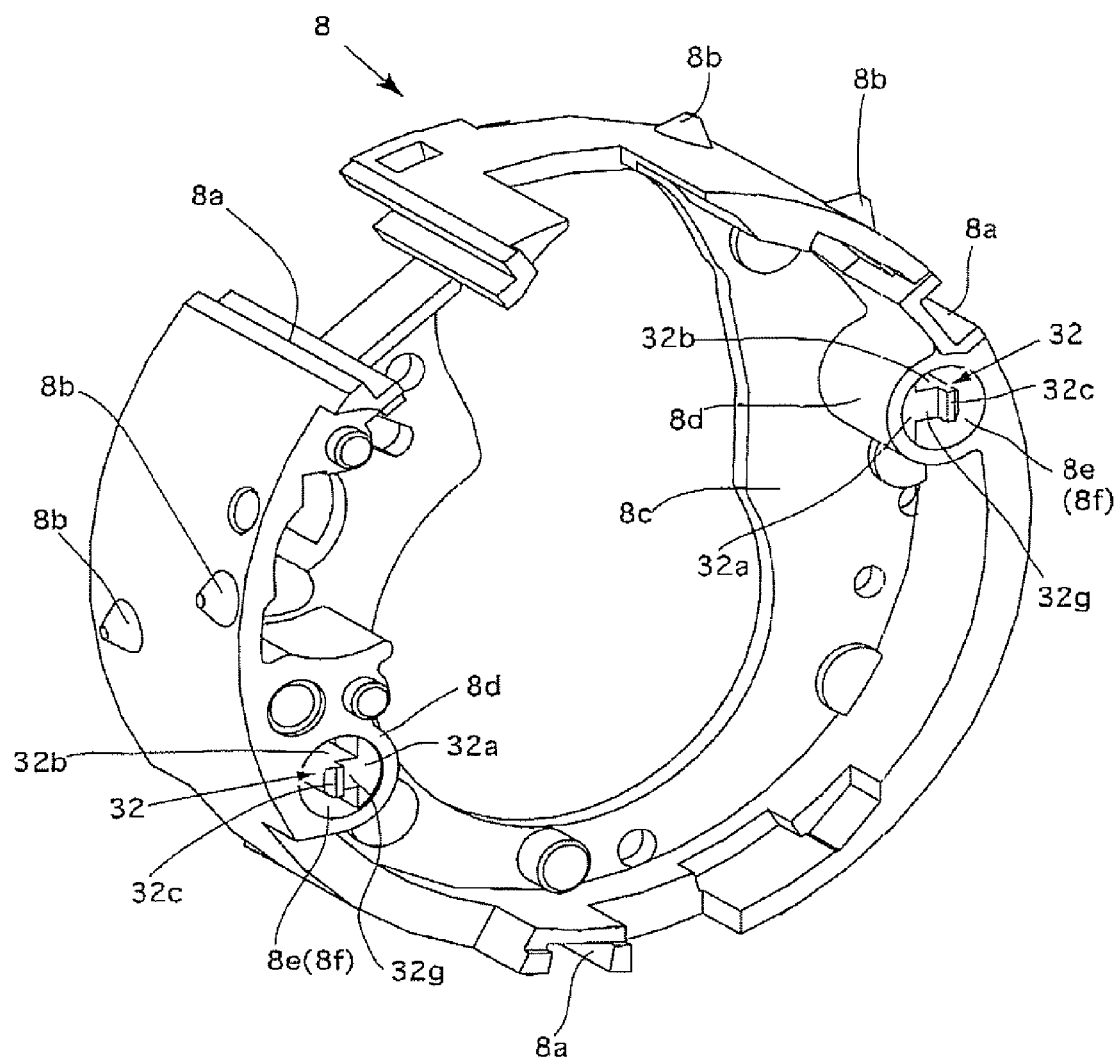
FIG. 13 is a perspective view of the second lens group moving frame shown in FIG. 7A, viewed obliquely from rear thereof.
Figure 14:
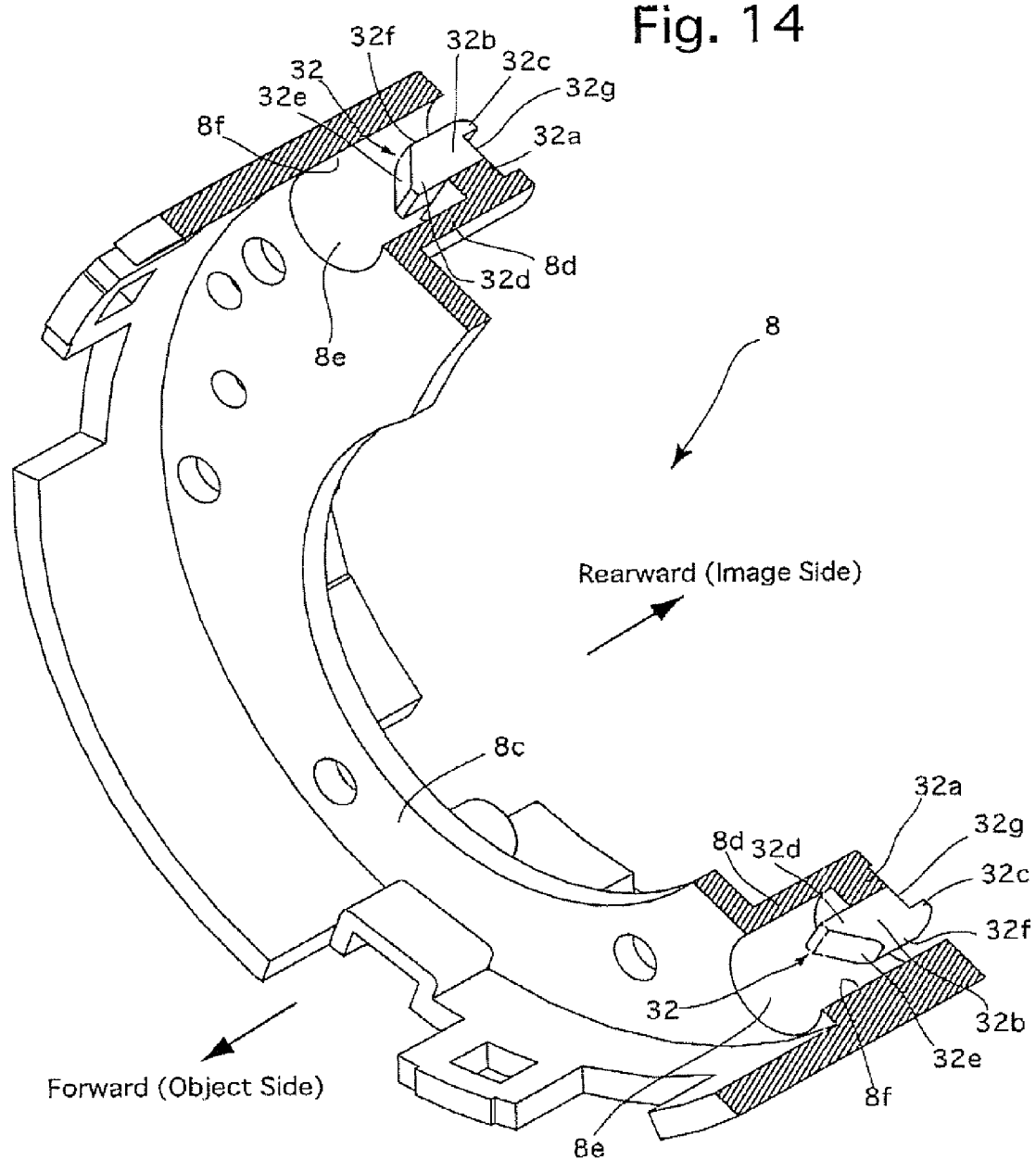
FIG. 14 is a perspective view of the second lens group moving frame shown in FIG. 7A, showing a cross-sectional profile thereof taken along a plane in which a pair of spring-hooked projections lie.

As shown in FIGS. 12 through 14, the second lens group moving frame 8 in the shape of a ring is provided on an inner peripheral surface thereof with an annular inward flange 8c. The inward flange 8c is provided with a pair of spring-accommodating cylindrical portions 8d which are formed to extend rearward in the optical axis direction. The pair of spring-accommodating cylindrical portions 8d are formed on the inward flange 8c at positions on an inner peripheral surface of the second lens group moving frame 8. Each spring-accommodating cylindrical portion 8d is provided therein with an accommodation space 8e having a cylindrical tilt-restriction surface (tilt-restriction portion) 8f. The front end of the accommodation space 8e of each spring-accommodating cylindrical portion 8d is open forwards in the optical axis direction on a front surface of the inward flange 8c, and also the rear end of the accommodation space 8e of each spring-accommodating cylindrical portion 8d is open rearwards in the optical axis direction. The axis of each spring-accommodating cylindrical portion 8d (the cylindrical tilt-restriction surface 8f) is substantially parallel to the photographing optical axis Z.

The second lens group moving frame 8 is provided inside each spring-accommodating cylindrical portion 8d with a spring-hooked projection (spring-hook portion) 32 which projects radially outwards from a (substantially) radially inner portion of the spring-accommodating cylindrical portion 8d. As shown in FIGS. 14 through 19, the spring-hooked projection 32 is provided with a base portion 32a and a head portion 32b. The base portion 32a is provided on an internal surface of the spring-accommodating cylindrical portion 8d. The head portion 32b has a substantially rectangular column shape and is provided on top of the base portion 32a. The head portion 32b is provided with a retaining projection 32c which projects rearwards in the optical axis direction, and an engagement guide projection 32d which projects forwards in the optical axis direction. The engagement guide projection 32d is provided on a surface thereof which faces radially outwards with a beveled contacting surface (deformation guide surface) 32e. The beveled contacting surface 32e is inclined rearwards and radially outwards in a rearward direction (in the optical axis direction) so that the engagement guide projection 32d has a substantially right-angle triangular shape in longitudinal cross section, the hypotenuse of which corresponds to the beveled contacting surface 32e (see FIGS. 15 through 19). The head portion 32b of the spring-hooked projection 32 is further provided on a radially outermost edge thereof with an outer end surface 32f which is communicably connected to the beveled contacting surface 32e and which faces the cylindrical tilt-restriction surface 8f in a radial direction of the second lens group moving frame 8. The outer end surface 32f lies in a plane substantially parallel to the axis of the spring-accommodating cylindrical portion 8d. A space having a constant distance W (see FIG. 15) is secured between the outer end surface 32f and a portion of the cylindrical tilt-restriction surface 8f which faces the outer end surface 32f in a radial direction of the second lens group moving frame 8 (the vertical direction as viewed in FIG. 15). The retaining projection 32c is formed on the head portion 32b at the rear end of the outer end surface 32f. Each spring-hooked projection 32 is provided on a rear surface thereof with a radial surface 32g which extends radially inwards from the retaining projection 32c. The radial surface 32g extends in a radial direction of the second lens group moving frame 8.

The pair of spring-accommodating cylindrical portions 8d and the pair of spring-hooked projections 32, which are provided inside of the pair of spring-accommodating cylindrical portions 8d, respectively, are arranged at different positions in a circumferential direction of the second lens group moving frame 8. The circumferential positions of the pair of spring-hooked projections 32 correspond to those of the pair of spring-hooked projections 11c of the third movable barrel 11, respectively, and the pair of extension biasing springs 27 are extended to be installed between the pair of spring-hooked projections 32 and the pair of spring-hooked projections 11c, respectively. Each extension biasing spring 27 is an extension coil spring which is provided with a cylindrical coil spring portion 27a and two looped ends (engaging portions) 27b which are formed at opposite ends of the coil spring portion 27a, respectively. As shown in FIGS. 15 through 19, the outer diameter of each coil spring portion 27a is slightly smaller than the inner diameter of the cylindrical tilt-restriction surface 8f of each spring-accommodating cylindrical portion 8d so that the coil spring portion 27a can be inserted into the associated accommodation space 8e. Each looped end 27b is formed by turning one end of the extension biasing spring 27 once to be shaped into a loop and this loop is bent up into a substantially right angle to extend substantially in the axial direction of the coil spring portion 27a (the horizontal direction as viewed in FIG. 15). As shown in FIGS. 15 through 19, each looped end 27b substantially lies in a plane including the axis of the associated coil spring portion 27a.

Figure 15:
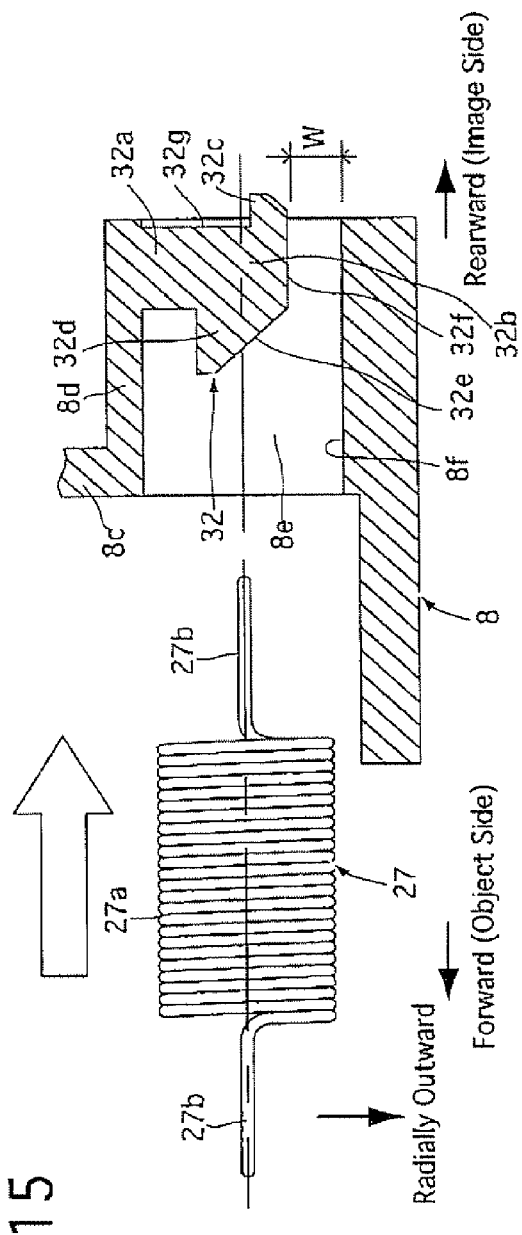
FIG. 15 is a longitudinal sectional view of a portion of the second lens group moving frame in the vicinity of one of the pair of spring-hooked projections and an associated spring-accommodating cylindrical recess, showing a manner of installing an extension biasing spring to the second lens group moving frame.
Figure 16:
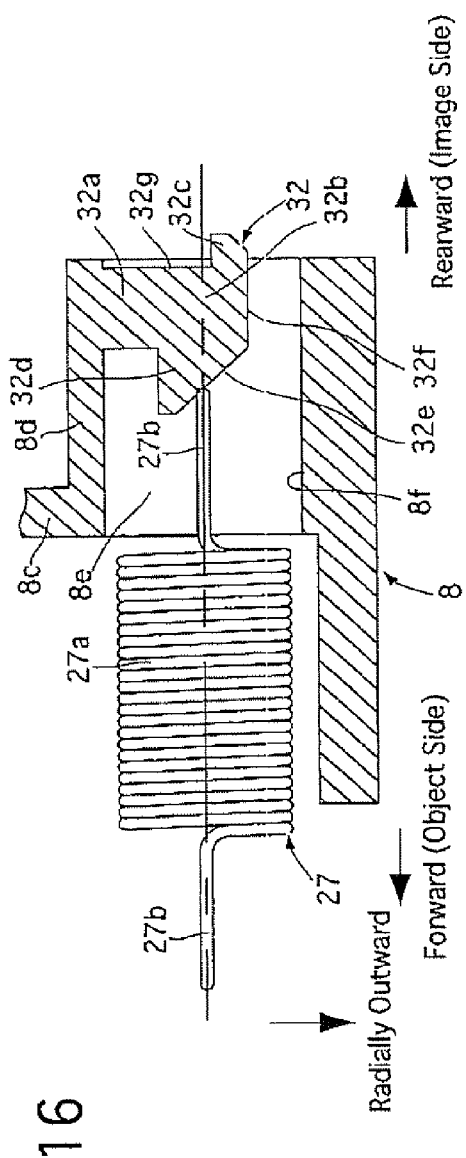
FIG. 16 is a view similar to that of FIG. 15, showing a state where the extension biasing spring is inserted into the spring-accommodating cylindrical recess from the state shown in FIG. 15 to a position where one looped end of the extension biasing spring is in contact with a beveled contacting surface of the associated spring-hooked projection.

When the pair of extension biasing springs 27 are extended to be installed between the second lens group moving frame 8 and the third movable barrel 11 in an assembling operation during manufacture or for repair, each extension biasing spring 27 can be fixed to firstly the second lens group moving frame 8 and subsequently the third movable barrel 11. A practical procedure of installing each extension biasing spring 27 between the second lens group moving frame 8 and the third movable barrel 11 in such a manner will be discussed hereinafter. When fixing each extension biasing spring 27 to the second lens group moving frame 8, the extension biasing spring 27 is inserted into the accommodation space 8e of the associated spring-accommodating cylindrical portion 8d in a direction from the front end to the rear end of the second lens group moving frame 8 after the extension biasing spring 27 has been oriented so that the axis of the coil spring portion 27a substantially coincides with the axis of the associated spring-accommodating cylindrical portion 8d as shown in FIG. 15. Upon the extension biasing spring 27 being inserted into the accommodation space 8e by a predetermined amount, one of the two looped ends 27b has entered the accommodation space 8e so that the far end of the entered looped end 27b comes in contact with the beveled contacting surface 32e of the spring-hooked projection 32 as shown in FIG. 16. The beveled contacting surface 32e is formed in an inclined plane which is inclined radially outwards (in a radially outward direction of the second lens group moving frame 8) in the direction of insertion of the extension biasing spring 27 (rearwards in the optical axis direction). Therefore, further inserting the extension biasing spring 27 into the accommodation space 8e from the state shown in FIG. 16, in which the far end of the looped end 27b is in contact with the beveled contacting surface 32e of the spring-hooked projection 32, causes the looped end 27b to be pushed radially outwards by a component force which is produced via the beveled contacting surface 32e to be exerted on the looped end 27b, thus causing the looped end 27b to be resiliently deformed radially outwards so that the far end of the looped end 27b moves onto the outer end surface 32f of the spring-hooked projection 32. Thereupon, as a reaction force of the resiliently deformed looped end 27b, a force to warp the coil spring portion 27a is exerted on the coil spring portion 27a. However, at this time the coil spring portion 27a has partly entered the spring-accommodating cylindrical portion 8d (the accommodation space 8e) together with the resiliently deformed looped end 27b in the state shown in FIG. 17, so that the coil spring portion 27a is prevented from moving (being warped) by pressure contact of an outer peripheral portion of the coil spring portion 27a with the cylindrical tilt-restriction surface 8f. Accordingly, the pair of extension biasing springs 27 can be inserted into the pair of spring-accommodating cylindrical portions 8d, respectively, without buckling.

Figure 17:
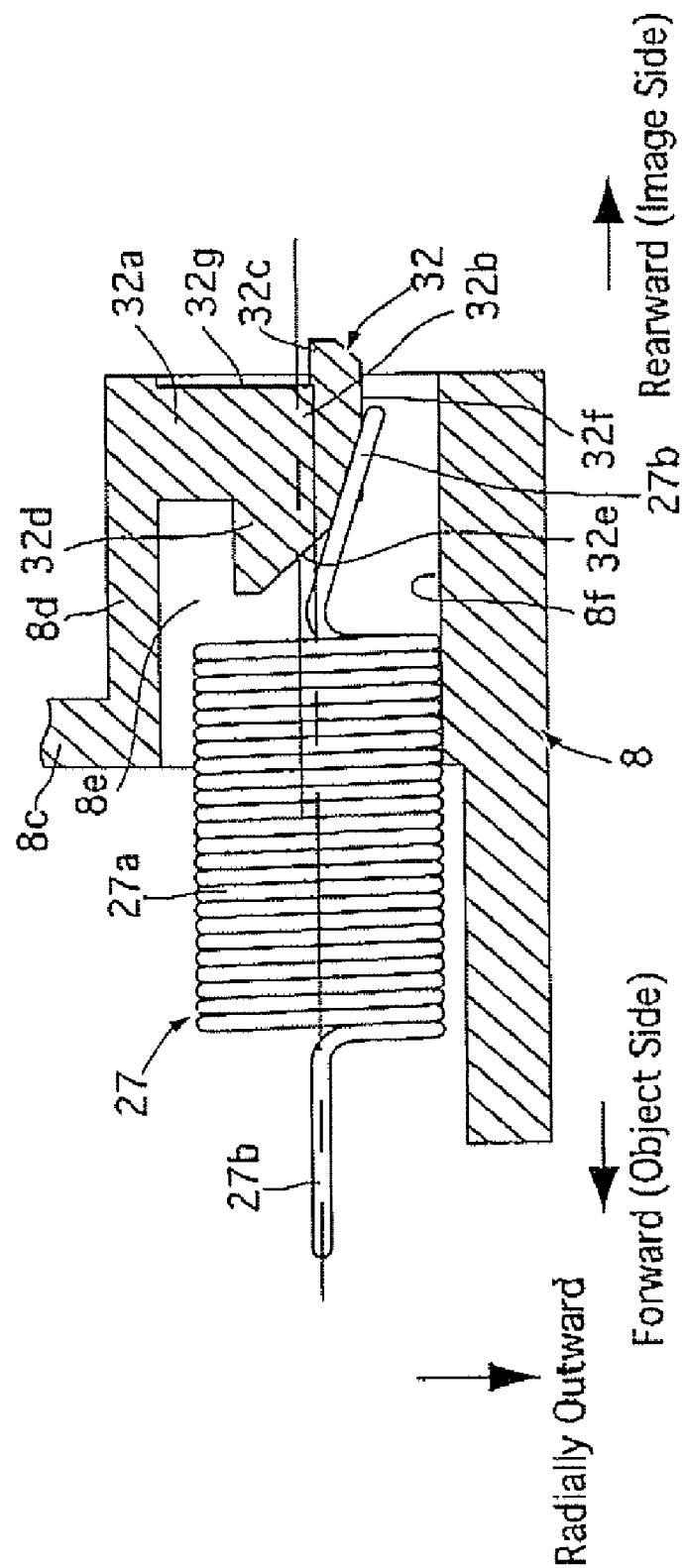
FIG. 17 is a view similar to that of FIG. 15, showing a state where the extension biasing spring is further inserted into the spring-accommodating cylindrical recess from the state shown in FIG. 16 to a position where one looped end of the extension biasing spring has slid on the beveled surface of the associated spring-hooked projection and resiliently deformed in a radial direction of the second lens group moving frame.
Figure 18:
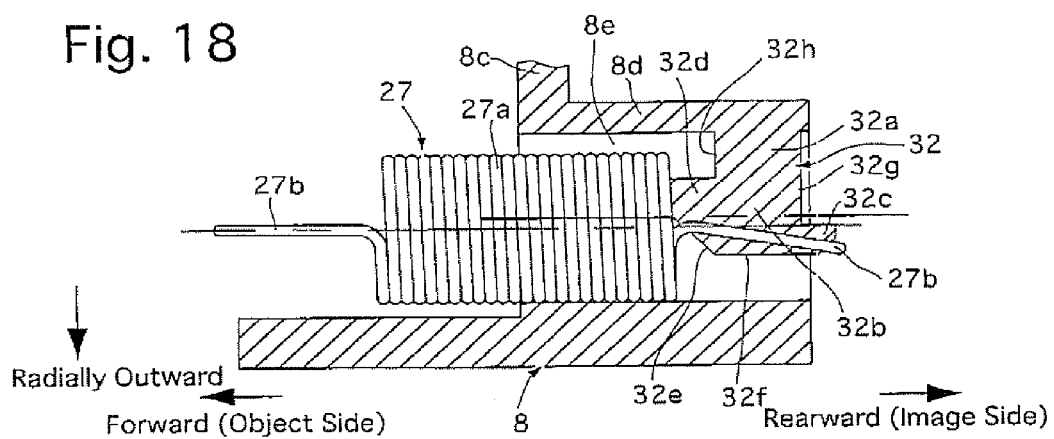
FIG. 18 is a view similar to that of FIG. 15, showing a state where the extension biasing spring is further inserted into the spring-accommodating cylindrical recess from the state shown in FIG. 17 to a position where one looped end of the extension biasing spring has reached a retaining projection formed on the associated spring-hooked projection.

Further insertion of the extension biasing spring 27 into the accommodation space 8e from the state shown in FIG. 17 causes the far end of the looped end 27b to slide on the outer end surface 32f with the looped end 27b remaining resiliently deformed and subsequently causes the far end of the looped end 27b to reach a point where the far end of the looped end 27b is caught on the retaining projection 32c of the spring-hooked projection 32 as shown in FIG. 18. In the state shown in FIG. 18, the extension biasing spring 27 has been inserted further into the accommodation space 8e so that the coil spring portion 27a is inserted slight over the engagement guide projection 32d (i.e., so that the engagement guide projection 32d enters slightly into the coil spring portion 27a). In this state, to prevent the base portion 32a of the spring-hooked projection 32 from interfering with the coil spring portion 27a, a stepped portion 32h is formed between the base portion 32a and the engagement guide projection 32d. Pressing the extension biasing spring 27 slightly into the accommodation space 8e from the position of the extension biasing spring 27 shown in FIG. 18 causes the far end of the looped end 27b to ride up over the retaining projection 32c to be engaged with the radial surface 32g, which is positioned on the rear end side of the head portion 32b. The retaining projection 32c is provided at a rear end thereof with a beveled surface (chamfered end) which makes it easy for the far end of the looped end 27b to move in a direction to be engaged with the radial surface 32g.

Figure 20:
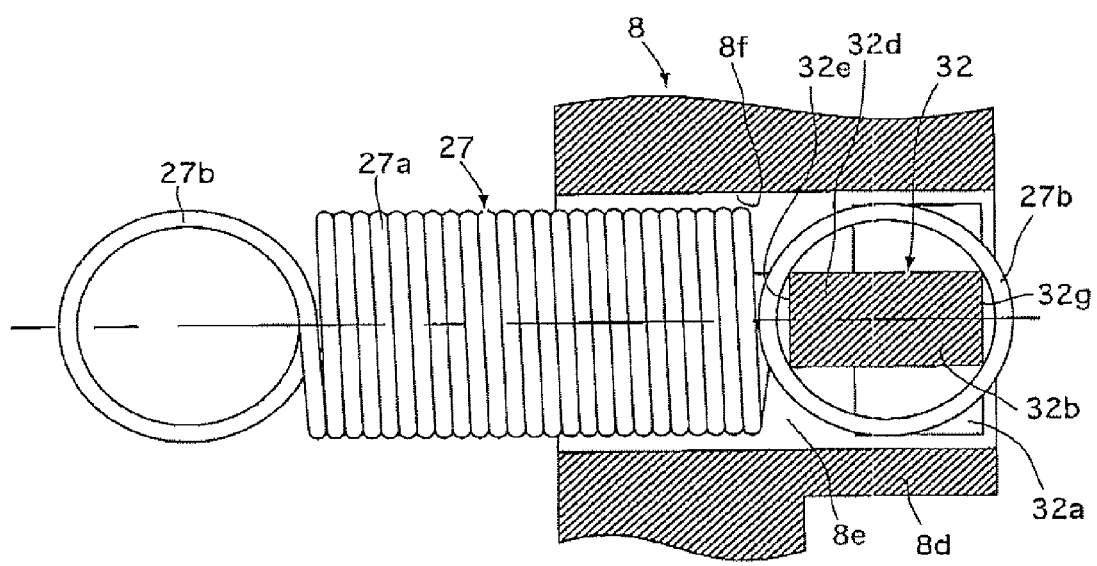
FIG. 20 is a cross sectional view taken along XX—XX line shown in FIG. 19, showing a state where one looped end of the extension biasing spring is seated over the associated spring-hooked projection.

Upon the looped end 27*b* being engaged with the radial surface 32*g*, the looped end 27*b* is prevented from moving back to the outer end surface 32*f* (i.e., moving in a radially outward direction), and hence is prevented front being disengaged from the spring-hooked projection 32. In this state, as shown in FIG. 20, the head portion 32*b* of the spring-hooked projection 32 is inscribed in the inner circular edge of the looped end 27*b* at four points in total: two corners of the engagement guide projection 32*d* which correspond to opposite edges (left upper and lower corners as viewed in FIG. 20) of the beveled contacting surface 32*e*, respectively, and the other two corners of the head portion 32*b* which correspond to opposite edges (right upper and lower corners as viewed in FIG. 20) of the radial surface 32*g*, respectively. This arrangement wherein the spring-hooked projection 32 is made to be inscribed in the inner circular edge of the looped end 27*b* at a plurality of points stabilizes the looped end 27*b* to thereby make it difficult for the looped end 27*b* to come off the spring-hooked projection 32.

Figure 19:
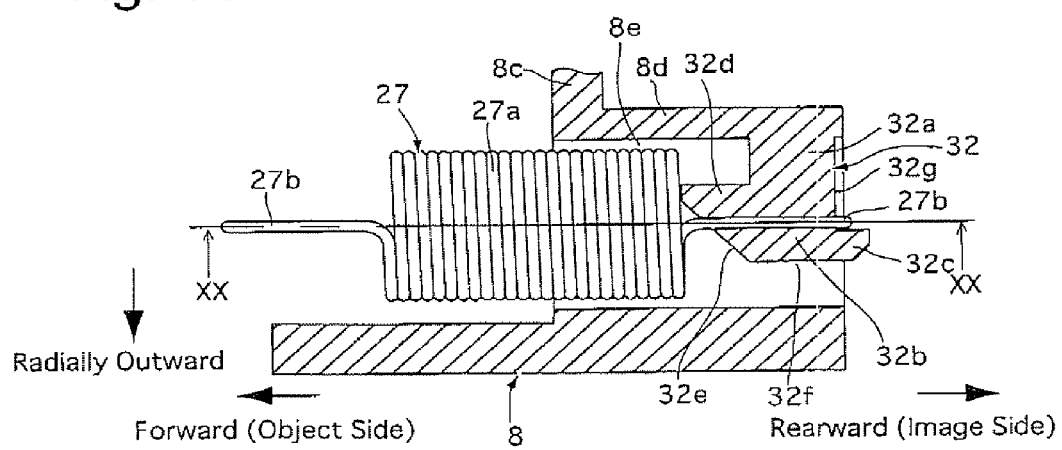
FIG. 19 is a view similar to that of FIG. 15, showing a state where the extension biasing spring is inserted into the spring-accommodating cylindrical recess from the state shown in FIG. 18 to a position where one looped end of the extension biasing spring has ridden up over the retaining projection and is engaged with a radial surface of the associated spring-hooked projection.

In the state shown in FIGS. 19 and 20, in which one of the pair of looped ends 27*b* of the extension biasing spring 27 is engaged with the spring-hooked projection 32, the looped end 27*b* is not disengaged from the head portion 32*b* even if a force is exerted on the extension biasing spring 27 to move the extension biasing spring 27 in the axial direction of the coil spring portion 27*a*. For instance, unlike the beveled contacting surface 32*e*, the radial surface 32*g* of the spring-hooked projection 32 is shaped so as not to generate a component force that resiliently deforms the associated looped end 27*b*. Therefore, even if the extension biasing spring 27 is moved in a direction to pull the extension biasing spring 27 out of the spring-accommodating cylindrical portion 8*d* (leftward as viewed in FIG. 19), the looped end 27*b* does not ride back over the retaining projection 32*c* from the radial surface 32*g* toward the outer end surface 32*f*.

Additionally, in the state shown in FIGS. 19 and 20, in which one of the pair of looped ends 27*b* of the extension biasing spring 27 is engaged with the spring-hooked projection 32, the cylindrical tilt-restriction surface 8*f* that surrounds the coil spring portion 27*a* of the associated extension biasing spring 27 prevents the coil spring portion 27*a* from moving in a radial direction thereof relative to the associated spring-accommodating cylindrical portion 8*d*. If neither of the pair of spring-accommodating cylindrical portions 8*d* were to have the cylindrical tilt-restriction surface 8*f*, there would be a possibility of the looped end 27*b* being disengaged from the spring-hooked projection 32 by resiliently deforming the coil spring portion 27*a* in a radial direction thereof. Conversely, providing each spring-accommodating cylindrical portion 8*d* with the cylindrical tilt-restriction surface 8*f* prevents the coil spring portion 27*a* from being resiliently deformed, thus making it possible to maintain the engagement between the looped end 27*b* and the spring-hooked projection 32. To disengage the extension biasing spring 27 from the spring-hooked projection 32, a procedure of resiliently deforming the looped end 27*b*, which is engaged with the spring-hooked projection 32, downwards while pulling the same looped end 27*b* rightwards as viewed in FIG. 18 is required to make the looped end 27*b* ride back over the retaining projection 32*c*. Unless disengaged intentionally from the spring-hooked projection 32 by carrying out this procedure, the looped end 27*b* which is engaged with the spring-hooked projection 32 does not unintentionally come off the spring-hooked projection 32.

Accordingly, when fixing each extension biasing spring 27 to the second lens group moving frame 8, one of the pair of looped ends 27*b* of the extension biasing spring 27 can be automatically seated over the spring-hooked projection 32 simply by inserting the extension biasing spring 27 from one looped end 27*b* thereof into the associated spring-accommodating cylindrical portion 8*d*. After one of the pair of looped ends 27*b* of the extension biasing spring 27 has been seated over the spring-hooked projection 32, this engagement between the looped end 27*b* of the extension biasing spring 27 cannot be released unintentionally. Consequently, the looped end 27*b* does not have to be cemented to the spring-hooked projection 32 or held by hand on the spring-hooked projection 32 during assembly.

After the pair of extension biasing springs 27 have been fixed to the second lens group moving frame 8, the remaining looped end 27*b* of each of the pair of extension biasing springs 27, which is not engaged with the second lens group moving frame 8, is brought into engagement with the pair of spring-hooked projections 11*c* of the third movable barrel 11, respectively. Each of the remaining looped ends 27*b* can be seated over the associated spring-hooked projection 11*c* by stretching the extension biasing spring 27 forward, beyond the inward flange 11*b*, with each looped end 27*b* being held with a holding device such as tweezers. In this manner, the pair of extension biasing springs 27 which are extended and installed between the second lens group moving frame 8 and the third movable barrel 11 bias the third movable barrel 11 rearward in the optical axis direction to eliminate backlash between the set of three cam followers 25 and the set of three outer cam grooves 9*b* and simultaneously bias the second lens group moving frame 8 forward in the optical axis direction to eliminate backlash between the set of three inner cam grooves 9*a* and the set of three front cam followers 8*b*, and between the set of three inner cam grooves 9*a* and the set of three rear cam followers 8*b*, thus improving the positional accuracy of each of the first lens group L1 and the second lens group L2.

As can be understood from the above description, according to the extension spring installation structure according to the present invention, the pair of extension biasing springs 27, each of which is an extension coil spring, can be extended so as to be installed between the second lens group moving frame 8 and the third movable barrel 11 very easily. Specifically, a troublesome operation cementing each extension biasing spring 27 to the second lens group moving frame 8 or the third movable barrel 11 is no longer necessary; moreover, each extension biasing spring 27 can be fixed to firstly the second lens group moving frame 8 and subsequently the third movable barrel 11, which increases the degree of freedom and ease of installing the pair of extension biasing springs 27.

However, the present invention is not limited solely to the above illustrated embodiment. Obvious changes may be made in the specific embodiment of the present invention described herein, such modifications being within the spirit and scope of the invention claimed. For instance, although the cylindrical tilt-restriction surface 8*f* of each spring-accommodating cylindrical portion 8*d* has a complete cylindrical shape which completely surrounds an outer peripheral surface of the cylindrical coil spring portion 27*a* of the associated extension biasing spring 27 in the above illustrated embodiment of the extension spring installation structure, it is possible for the cylindrical tilt-restriction surface 8*f* of each spring-accommodating cylindrical portion 8*d* to be formed as an incomplete cylindrical surface. The tilt-restriction surface is still effective so long as at least a surface portion thereof prevents the coil spring portion 27*a* of the associated extension biasing spring 27 from moving (being warped) downwards with respect to FIGS. 15 through 19. Namely, it is possible for the cylindrical tilt-restriction surface 8f to be formed as a partial-cylindrical surface which is formed only on a portion of the inner peripheral surface of the associated spring-accommodating cylindrical portion 8d which faces the outer end surface 32f. Moreover, a flat surface or a surface having any other shape can be adopted as the tilt-restriction surface as an alternative to the cylindrical tilt-restriction surface 8f of the present invention.

Although four corners of each spring-hooked projection 32 are inscribed in the inner circular edge of one looped end 27b of the associated extension biasing spring 27 as shown in FIG. 20 in the above illustrated embodiment of the extension spring installation structure, the shape of the looped end 27b and the shape of a portion of the spring-hooked projection 32 which is inscribed in the inner circular edge of the looped end 27b can be modified. For instance, a portion of the spring-hooked projection 32 shown in FIG. 20 which corresponds to the radial surface 32g can be shaped as a circular arc in cross section (a partial-cylindrical surface) so that the area of a portion of the spring-hooked projection 32 which is engaged with the looped end 27b is increased to stabilize the engagement of each spring-hooked projection 32 with one looped end 27b of the associated extension biasing spring 27.

Although the pair of spring-accommodating cylindrical portions 8d and the pair of spring-hooked projections 32 are formed on the second lens group moving frame 8 to improve the ease of installation of the pair of extension biasing springs 27 in the above illustrated embodiment of the extension spring installation structure, structures similar to the pair of spring-accommodating cylindrical portions 8d and the pair of spring-hooked projections 32 can also be formed on the third movable barrel 11.

Although the pair of extension biasing springs 27 are arranged at different circumferential positions, respectively, in the above illustrated embodiment of the extension spring installation structure, the number of the extension coil springs (27), the number of the spring-hook portions (32) and the number of the tilt-restriction portions (8f) are not limited solely to two. From the viewpoint of support stability, it is desirable that at least two of the extension coil springs, at least two corresponding spring-hook portions, and at least two corresponding tilt-restriction portions be provided and arranged at different circumferential positions, respectively.

Although the present invention can be effectively applied to a zoom lens such as the above described zoom lens 40, effects similar to those obtained in the above illustrated embodiment of the zoom lens can also be obtained even in the case where the present invention is applied to a fixed-focal lens.

It is indicated that all matter contained herein is illustrative and does not limit the scope of the present invention.

What is claimed is:

1. An extension spring installation structure of a lens barrel including a pair of relatively movable members which are movable relative to each other in an optical axis direction and at least one of which supports an optical element, said extension spring installation structure comprising:

at least one extension coil spring which biases said pair of relatively movable members in directions to approach each other, said extension coil spring including a coil spring portion and a pair of engaging portions provided at opposite ends of said coil spring portion, respectively; and at least one spring-hook portion and at least one tilt-restriction portion which are formed on at least one of said pair of relatively movable members, wherein one of said pair of engaging portions is engaged with said spring-hook portion by a movement of said extension coil spring toward the spring-hook portion in a direction along an axis of said coil spring portion, wherein said spring-hook portion is shaped so as to be prevented from being disengaged from said one engaging portion of said extension coil spring even in the case where said extension coil spring is moved along said axis of said coil spring portion in a state where said one engaging portion of said extension coil spring is engaged with said spring-hook portion, and wherein said tilt-restriction portion prevents said coil spring portion from moving in a radial direction of said coil spring portion in said state where said one engaging portion of said extension coil spring is engaged with said spring-hook portion.

2. The extension spring installation structure according to claim 1, wherein said spring-hook portion comprises a deformation guide surface, wherein, when said extension coil spring is moved in an insertion direction along said axis of said coil spring portion so as to be engaged with said spring-hook portion, said deformation guide surface firstly comes into contact with said one engaging portion of said extension coil spring and subsequently resiliently deforms said one engaging portion of said extension coil spring in a predetermined deforming direction so that said one engaging portion of said extension coil spring rides over said spring-hook portion to be seated over said spring-hook portion.

3. The extension spring installation structure according to claim 2, wherein said spring-hook portion further comprises a retaining projection which prevents said one engaging portion of said extension coil spring from moving in a direction so as to be disengaged from said spring-hook portion after said one engaging portion of said extension coil spring rides over said spring-hook portion and is seated over said spring-hook portion.

4. The extension spring installation structure according to claim 2, wherein said tilt-restriction portion restricts movement of said coil spring portion in at least said predetermined deforming direction.

5. The extension spring installation structure according to claim 1, wherein said tilt-restriction portion comprises a cylindrical surface which surrounds said spring-hook portion.

6. The extension spring installation structure according to claim 5, wherein said spring-hook portion is shaped as a projection which projects from said cylindrical surface in a radially outward direction of said one of said pair of relatively movable members.

7. The extension spring installation structure according to claim 6, wherein said spring-hook portion comprises a first projection and a second projection which project from a radially outer end portion of said spring-hook portion substantially in opposite directions away from each other along said optical axis direction, wherein said deformation guide surface is formed on said first projection, and wherein a radially outer end surface of said spring-hook portion is provided between said first projection and said second projection and lies in a plane substantially parallel to said optical axis.

8. The extension spring installation structure according to claim 2, wherein said deformation guide surface lies in a plane which is inclined with respect to said optical axis direction.

9. The extension spring installation structure according to claim 1, wherein said one of said pair of relatively movable members, which includes said tilt-restriction portion, comprises an annular member, and
wherein said tilt-restriction portion is formed along an inner peripheral surface of said annular member.

10. The extension spring installation structure according to claim 9, wherein said one of said pair of relatively movable members comprises an inward flange which projects radially inwards from said inner peripheral surface of said annular member, and
wherein a portion of said tilt-restriction portion is formed in said inward flange.

11. The extension spring installation structure according to claim 1, wherein said one engaging portion of said extension coil spring is shaped as a loop, and
wherein said spring-hook portion is inscribed in said loop at four corners of said spring-hook portion in said state where said one engaging portion of said extension coil spring is engaged with said spring-hook portion.

12. The extension spring installation structure according to claim 1, wherein said extension coil spring, said spring-hook portion and said tilt-restriction portion comprise at least two extension coil springs, at least two spring-hook portions and at least two tilt-restriction portions, respectively, which are arranged at different circumferential positions about said optical axis.

13. The extension spring installation structure according to claim 12, wherein said two extension coil springs, said two spring-hook portions and said two tilt-restriction portions are symmetrically arranged with respect to said optical axis.

14. The extension spring installation structure according to claim 1, wherein each of said pair of relatively movable members supports a lens group of a zoom lens optical system.

15. The extension spring installation structure according to claim 1, wherein said pair of relatively movable members are moved relative to each other in said optical axis direction by a rotation of a cam ring.

16. A lens barrel comprising:
a front annular movable member and a rear annular movable member, which are arranged on an axis common with an optical axis of an optical element, to be movable relative to each other in said optical axis direction, at least one of said front and rear annular movable members supporting said optical element;
at least one extension coil spring which is extended to be installed between said front and rear annular movable members to bias said front and rear annular movable members in directions to approach each other, said extension coil spring including a coil spring portion and a pair of looped ends provided at opposite ends of said coil spring portion, respectively; and
at least one spring-hook portion and at least one tilt-restriction portion which are formed on at least one of said front and rear annular movable members,
wherein one of said pair of looped ends is engaged with said spring-hook portion by a movement of said extension coil spring toward the spring-hook portion in a direction along an axis of said coil spring portion,
wherein said spring-hook portion is shaped so that said one looped end of said extension coil spring is prevented from being disengaged therefrom even if said extension coil spring is moved along said axis of said coil spring portion in a state where said one looped end of said extension coil spring is engaged with said spring-hook portion, and
wherein said tilt-restriction portion restricts movement of said coil spring portion in a radial direction of said coil spring portion in said state where said one looped end of said extension coil spring is engaged with said spring-hook portion.

* * * * *